(12) United States Patent
Taniguchi et al.

(10) Patent No.: US 11,965,431 B2
(45) Date of Patent: Apr. 23, 2024

(54) TURBINE AND TURBOCHARGER

(71) Applicant: MITSUBISHI HEAVY INDUSTRIES ENGINE & TURBOCHARGER, LTD., Sagamihara (JP)

(72) Inventors: Nao Taniguchi, Tokyo (JP); Toyotaka Yoshida, Tokyo (JP); Makoto Ozaki, Sagamihara (JP); Nobuhito Oka, Sagamihara (JP)

(73) Assignee: MITSUBISHI HEAVY INDUSTRIES ENGINE & TURBOCHARGER, LTD, Sagamihara (JP)

( * ) Notice: Subject to any disclaimer, the term of this patent is extended or adjusted under 35 U.S.C. 154(b) by 14 days.

(21) Appl. No.: 17/783,858

(22) PCT Filed: Jan. 7, 2020

(86) PCT No.: PCT/JP2020/000185
§ 371 (c)(1),
(2) Date: Jun. 9, 2022

(87) PCT Pub. No.: WO2021/140569
PCT Pub. Date: Jul. 15, 2021

(65) Prior Publication Data
US 2023/0027258 A1  Jan. 26, 2023

(51) Int. Cl.
*F01D 9/04* (2006.01)
*F02C 6/12* (2006.01)

(52) U.S. Cl.
CPC ............ *F01D 9/041* (2013.01); *F01D 9/045* (2013.01); *F02C 6/12* (2013.01); *F05D 2220/40* (2013.01);
(Continued)

(58) Field of Classification Search
CPC . F01D 9/041; F01D 9/045; F02C 6/12; F05D 2220/40; F05D 2240/121;
(Continued)

(56) References Cited

U.S. PATENT DOCUMENTS 4,349,314 A * 9/1982 Erwin ..................... F04D 21/00
415/181
4,824,325 A * 4/1989 Bandukwalla ........ F04D 29/444
415/208.4
(Continued)

FOREIGN PATENT DOCUMENTS

JP      8-61005 A    3/1996
JP    2015-14252 A   1/2015
(Continued)

OTHER PUBLICATIONS

Yokoyama et al (JP 2018123802) Machine Translation (Year: 2018).*
(Continued)

*Primary Examiner* — Brian Christopher Delrue
(74) *Attorney, Agent, or Firm* — BIRCH, STEWART, KOLASCH & BIRCH, LLP

(57) ABSTRACT

A turbine is provided with: a turbine wheel configured to rotate about an axis O1; a turbine housing accommodating the turbine wheel and defining an annular nozzle passage on the outer peripheral side of the turbine wheel; and a plurality of low solidity nozzle vanes 6 arranged in the nozzle passage at an interval in the circumferential direction. Circumferentially adjacent low solidity nozzle vanes 6 are disposed at different radial positions in a connection position of each of the low solidity nozzle vanes 6 with a hub-side wall surface of the hub-side wall surface and a shroud-side wall surface which define the nozzle passage.

27 Claims, 11 Drawing Sheets

(52) U.S. Cl.
CPC .. *F05D 2240/121* (2013.01); *F05D 2240/122* (2013.01); *F05D 2240/128* (2013.01)

(58) Field of Classification Search
CPC ......... F05D 2240/122; F05D 2240/128; Y02T 10/12; F02B 37/24
See application file for complete search history.

(56) References Cited

U.S. PATENT DOCUMENTS

| | | | | |
|---|---|---|---|---|
| 5,178,516 | A * | 1/1993 | Nakagawa | ............ F04D 29/444 415/211.2 |
| 5,516,263 | A * | 5/1996 | Nishida | ................. F04D 29/444 415/208.4 |
| 2013/0170975 | A1 * | 7/2013 | Ishii | ...................... F01D 25/125 415/208.1 |
| 2013/0294895 | A1 | 11/2013 | Yokoyama et al. | |
| 2014/0205458 | A1 * | 7/2014 | Japikse | ................. B23P 15/006 416/179 |
| 2014/0321979 | A1 * | 10/2014 | Beers | ...................... F01D 9/045 415/115 |
| 2015/0377240 | A1 * | 12/2015 | Nasir | .................... F04D 29/444 415/55.2 |
| 2018/0238226 | A1 * | 8/2018 | Wang | .................... F02B 37/025 |
| 2018/0291927 | A1 * | 10/2018 | Kerth | .................... F04D 29/444 |
| 2019/0249563 | A1 * | 8/2019 | Motoda | ..................... F01D 9/02 |
| 2019/0264575 | A1 * | 8/2019 | Motoda | ................ F01D 17/165 |

FOREIGN PATENT DOCUMENTS

| | | | | |
|---|---|---|---|---|
| JP | | 2018-123802 A | 8/2018 | |
| JP | | 2018123802 A | * 8/2018 | ............... F01D 9/02 |
| JP | | 2018-145811 A | 9/2018 | |
| WO | WO 2012/043125 A1 | | 4/2012 | |

OTHER PUBLICATIONS

International Preliminary Report on Patentability and Written Opinion of the International Searching Authority for International Application No. PCT/JP2020/000185, dated Jul. 21, 2022. with English translation.

International Search Report for International Application No. PCT/JP2020/000185, dated Feb. 10, 2020.

* cited by examiner

Shroud side

Hub side

Arrangement in different radial positions + change in metal angle

Different chord length + change in metal angle

Wall inclination + change in metal angle

TURBINE AND TURBOCHARGER

TECHNICAL FIELD

The present disclosure relates to a turbine and a turbocharger.

BACKGROUND

Radial turbines and mixed flow turbines equipped with a flow rate adjustment mechanism for exhaust gas to be introduced into the turbine are often used as small gas turbines or expansion turbines used in power generation engines or turbochargers mounted on automobile engines due to advantages such as variable turbine rotation speed and variable turbine output or ensuring high responsiveness to changes in engine output.

A turbocharger equipped with the radial turbine or the mixed flow turbine is configured to, for example, rotary drive the turbine by exhaust gas from the engine, in turn rotary drive a compressor coaxially connected to the turbine to compress intake air, and supply the compressed air to the engine.

On the other hand, the exhaust gas flow rate adjustment mechanism is configured by arranging nozzle vanes in the circumferential direction in an annular nozzle passage defined by a turbine housing on the outer peripheral side of the turbine wheel.

Some exhaust gas flow rate adjustment mechanisms are provided with a plurality of variable nozzle vanes rotated by the drive of an actuator so that, in the closing operation, the leading edge of one of adjacent nozzle vanes overlaps the trailing edge of the other nozzle vane to close the passage, and are configured to freely adjust the size of the exhaust gas passage, that is, the flow rate of exhaust gas according to the rotation amount of each variable nozzle vane.

Further, some exhaust gas flow rate adjustment mechanisms are provided with a plurality of low solidity nozzle vanes fixedly arranged at an interval (gap serving as the passage) in the circumferential direction, and are configured to automatically adjust the flow rate of exhaust gas according to the magnitude of the exhaust gas pressure (see Patent Document 1, for example).

CITATION LIST

Patent Literature

Patent Document 1: JP2018-123802A

SUMMARY

Problems to be Solved

On the other hand, the turbocharger is operated under exhaust pulsation of the engine, and the exhaust gas pressure at the inlet of the turbine fluctuates greatly.

Therefore, the turbine may often be operated at an operating point that is significantly different from the design point (design performance). In such a case, the turbine efficiency is reduced.

Conventional measures to control the turbine performance reduction include controlling the throat area according to the turbine flow rate by applying variable nozzle vanes or reducing changes in the blade relative flow angle in response to the pressure fluctuation by applying low solidity nozzle vanes.

However, the application of variable nozzle vanes complicates the turbocharger structure, and the use of only low solidity nozzle vanes does not significantly improve the incidence characteristics of the blades.

The present disclosure was made in view of the above problems, and an object thereof is to provide a turbine and a turbocharger including the same whereby it is possible to greatly improve the blade incidence characteristics more than before by using only low solidity nozzle vanes without using variable nozzle vanes having a complicated structure when the pressure at the turbine inlet fluctuates greatly due to the exhaust pulsation of the engine, and it is possible to improve the turbine efficiency.

Solution to the Problems

A turbine according to an aspect of the present disclosure is provided with: a turbine wheel configured to rotate about an axis; a turbine housing accommodating the turbine wheel and defining an annular nozzle passage on an outer peripheral side of the turbine wheel; and a plurality of low solidity nozzle vanes arranged in the nozzle passage at an interval in a circumferential direction. Circumferentially adjacent low solidity nozzle vanes are disposed at different radial positions in a connection position of each of the low solidity nozzle vanes with a hub-side wall surface of the hub-side wall surface and a shroud-side wall surface which define the nozzle passage.

Further, a turbine according to an aspect of the present disclosure is provided with: a turbine wheel configured to rotate about an axis; a turbine housing accommodating the turbine wheel and defining an annular nozzle passage on an outer peripheral side of the turbine wheel; and a plurality of low solidity nozzle vanes arranged in the nozzle passage at an interval in a circumferential direction. Circumferentially adjacent low solidity nozzle vanes have different chord lengths in a connection position of each of the low solidity nozzle vanes with a hub-side wall surface of the hub-side wall surface and a shroud-side wall surface which define the nozzle passage.

Further, a turbine according to an aspect of the present disclosure is provided with: a turbine wheel configured to rotate about an axis; a turbine housing accommodating the turbine wheel and defining an annular nozzle passage on an outer peripheral side of the turbine wheel; and a plurality of low solidity nozzle vanes arranged in the nozzle passage at an interval in a circumferential direction. Each of the plurality of low solidity nozzle vanes is configured such that a blade height of a trailing edge is larger than a blade height of a leading edge.

A turbocharger according to an aspect of the present disclosure is provided with the above-described turbine.

Advantageous Effects

With a turbine and a turbocharger including the same according to an aspect of the present disclosure, it is possible to greatly improve the blade incidence characteristics by using only low solidity nozzles without using variable nozzles having a complicated structure when the pressure at the turbine inlet fluctuates greatly due to the exhaust pulsation of the engine, and it is possible to improve the turbine efficiency more than before.

DETAILED DESCRIPTION

First Embodiment

Hereinafter, a turbine and a turbocharger according to the first embodiment will be described with reference to FIGS. 1 to 4.

(Turbocharger)

The turbocharger according to the present embodiment is a turbocharger device which improves the engine output by using energy of exhaust gas discharged from the engine. This turbocharger rotary drives a turbine by exhaust gas discharged from the engine, thereby rotary driving a compressor coaxially connected to the turbine to compress intake air and supplying the compressed air to the engine.

Figure 1:
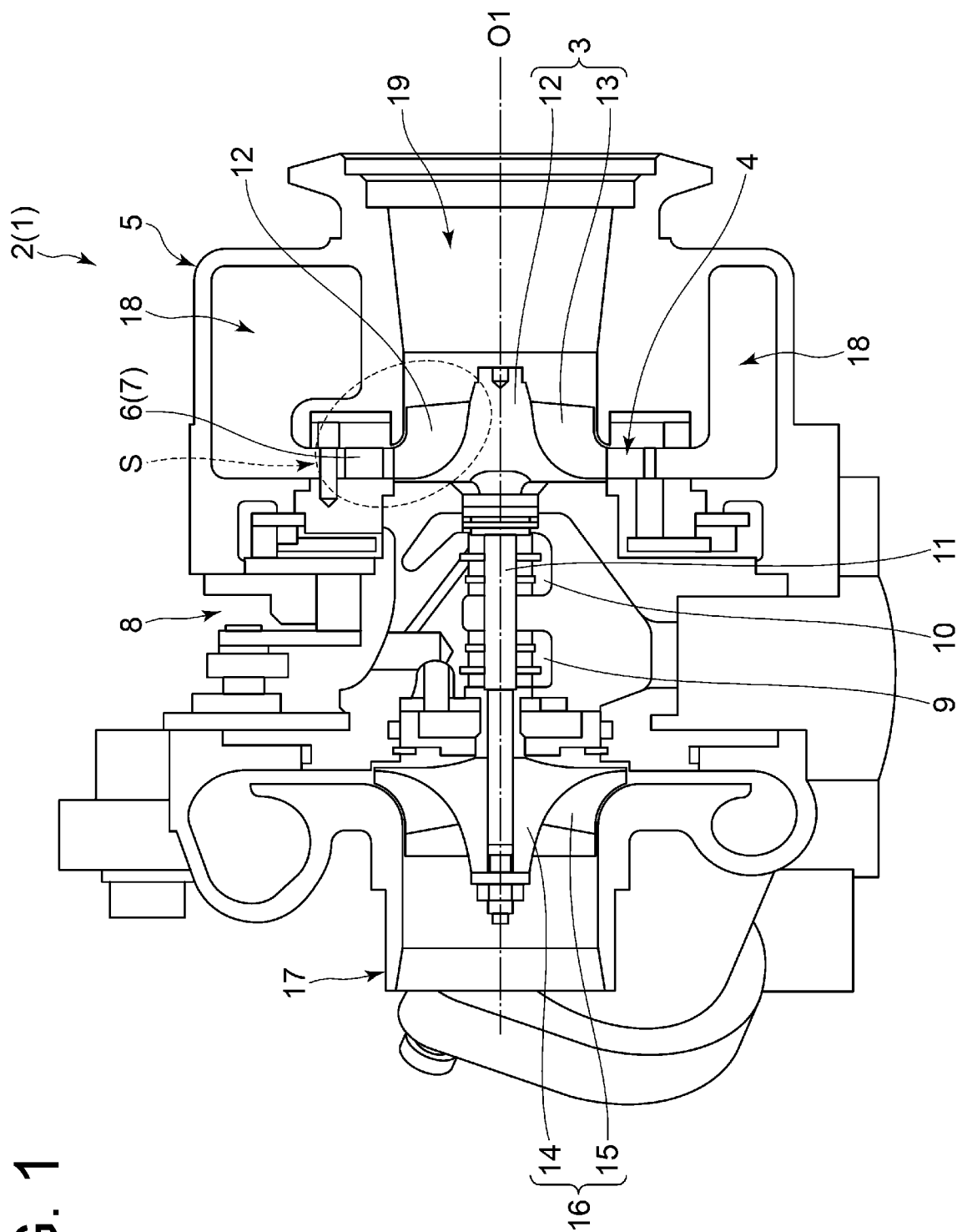
FIG. 1 is a diagram showing a turbine according to an aspect.

Specifically, as shown in FIG. 1, the turbocharger 1 of the present embodiment includes a radial turbine 2 or a mixed flow turbine (hereinafter, turbine).

(Turbine)

Figure 2:
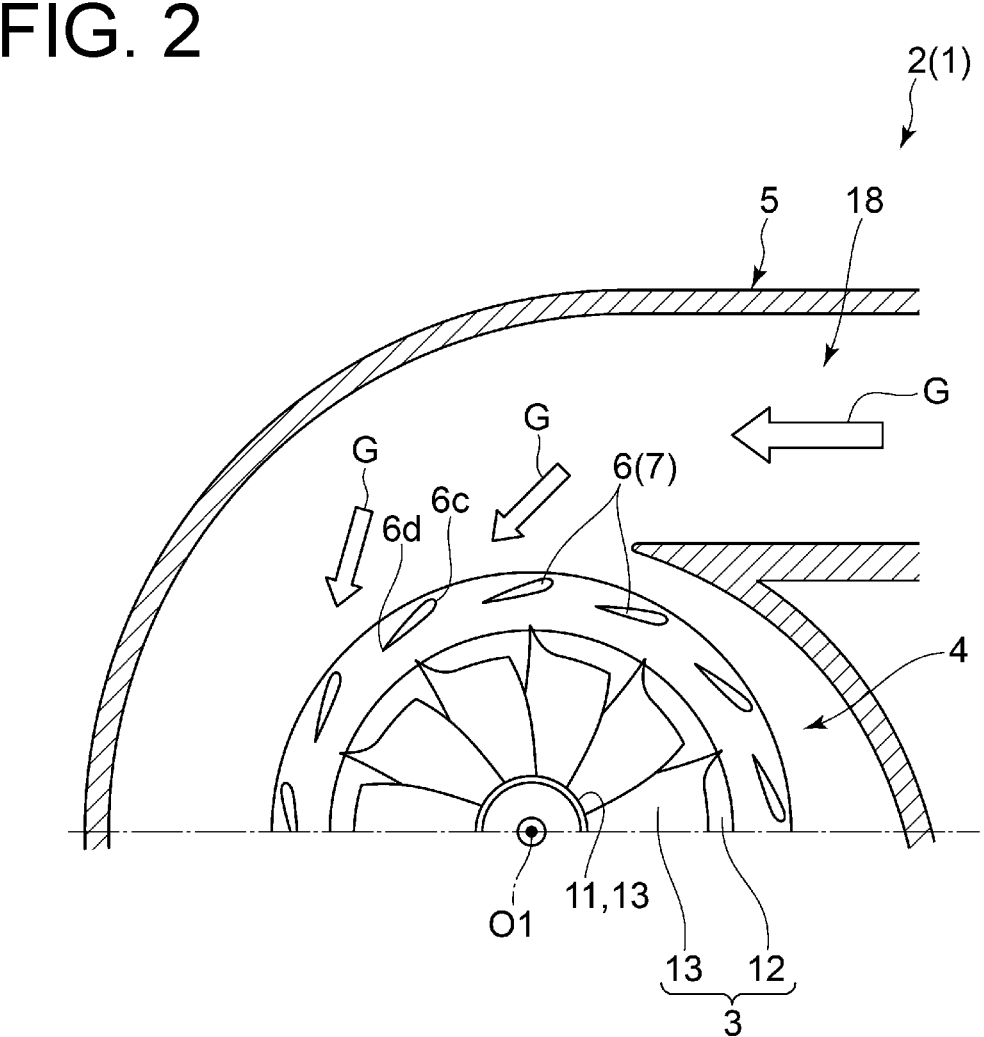
FIG. 2 is a diagram showing a nozzle passage and a flow rate adjustment mechanism of a turbine according to an aspect.
Figure 3:
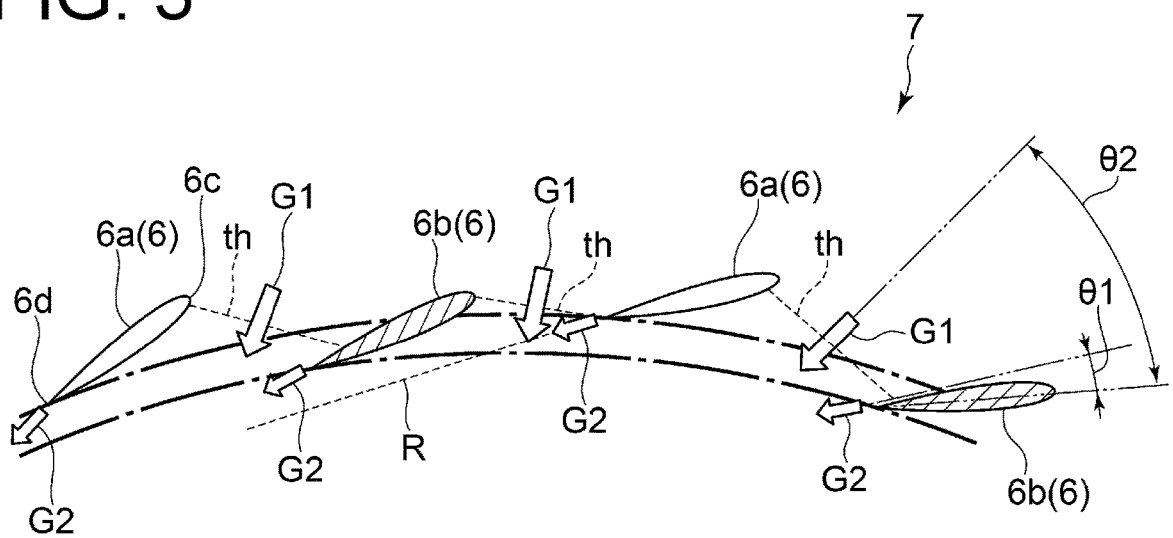
FIG. 3 is a diagram showing a flow rate adjustment mechanism of a turbine according to the first embodiment and shows the arrangement of nozzle vanes (first nozzle vanes and second nozzle vanes).

As shown in FIGS. 1, 2, and 3, the turbine 2 includes a turbine wheel 3 configured to rotate about an axis O1 of the turbocharger 1, a turbine housing 5 accommodating the turbine wheel 3 and forming an annular nozzle passage 4 on the outer peripheral side of the turbine wheel 3 about the axis O1, and a flow rate adjustment mechanism (flow rate adjustment mechanism for exhaust gas G) 7 composed of a plurality of nozzle vanes 6 arranged radially outward of the turbine wheel 3 in the nozzle passage 4 at a predetermined interval in the circumferential direction of the turbine wheel 3.

The turbine wheel 3 includes a truncated cone and substantially conical-shaped turbine hub 12 integrally formed at one end of a rotational shaft 11, which is rotatably supported by journal bearings 9 and 10 accommodated in a bearing housing 8, with their axes O1 coaxial, and a plurality of turbine blades 13 arranged on the peripheral surface of the turbine hub 12 at a predetermined interval in the circumferential direction centered at the axis O1.

At the other end of the rotational shaft 11, a truncated cone and substantially conical-shaped compressor hub 14 is integrally formed, with a plurality of compressor blades 15 arranged on the peripheral surface of the compressor hub 14 at a predetermined interval in the circumferential direction.

The compressor hub 14 and the compressor blades 15 constitute a compressor wheel 16. The compressor wheel 16 is accommodated in a compressor housing 17 in a rotatable manner about the axis O1.

In the present embodiment, a scroll passage 18 that communicates with the nozzle passage 4 and allows the exhaust gas G introduced from the outside of the turbine housing 5 to flow into the nozzle passage 4, and a discharge passage 19 that communicates with the nozzle passage 4 and allows the exhaust gas G having driven the turbine wheel 3 to flow out of the turbine housing 5 are provided in the turbine housing 5.

The scroll passage 18 is a substantially spiral flow passage formed on the outer peripheral side of the nozzle passage 4, and the discharge passage is a tubular flow passage extending along the axis O1.

The exhaust gas G from the scroll passage 18 flows through the nozzle passage 4 inward in the radial direction and enters the turbine wheel 3 to rotate the turbine wheel 3 around the axis O1. The exhaust gas G used to rotate the turbine wheel 3 is discharged out of the turbine housing 5 through the discharge passage 19.

On the other hand, for example, each of the nozzle vanes 6 of the flow rate adjustment mechanism 7 is configured to satisfy Lv<Lc/Nv, where Lv is the length (vane length) of a straight line connecting a leading edge 6c and a trailing edge 6d, Lc is the perimeter of a trailing edge incircle C1 passing through the trailing edge 6d, and Nv is the number of nozzle vanes.

That is, the nozzle vanes 6 of the flow rate adjustment mechanism 7 according to the present embodiment are low solidity nozzle vanes and are arranged such that circumferentially adjacent nozzle vanes 6 do not overlap, and a throat th is formed between the leading edge 6c of one of adjacent nozzle vanes 6 and the trailing edge 6d of the other nozzle vane 6 (see FIGS. 2 and 3).

The throat th indicates a portion having a minimum width between adjacent nozzle vanes 6.

Here, the present inventors have found that when the throat th is provided to eliminate nozzle overlap, and a difference ($\theta2-\theta1$) between the nozzle geometric outflow angle $\theta1$ (angle between the central axis connecting the leading edge 6c and the trailing edge 6d of the nozzle vane 6 and the flow direction of exhaust gas G2 flowing along the nozzle vane 6 which is prevailing at a low exhaust gas pressure (low pressure)) and the outflow angle $\theta2$ defined by the minimum nozzle throat th (approximately angle between the central axis connecting the leading edge 6c and the trailing edge 6d of the nozzle vane 6 and the flow direction of exhaust gas G1 flowing directly through the throat th which is prevailing at a high exhaust gas pressure (high pressure)) is increased, it is possible to increase the nozzle outflow angle fluctuation due to the pressure fluctuation of the exhaust gas G.

Figure 4:
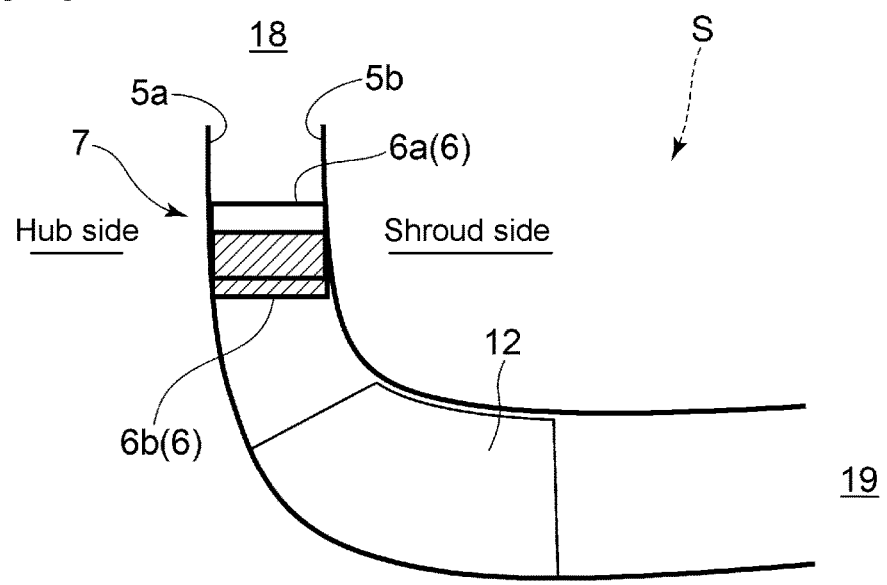
FIG. 4 is a diagram showing the turbine according to the first embodiment and the flow rate adjustment mechanism of the turbine and shows S portion in FIG. 1.

On the basis of this finding, as shown in FIGS. 3 and 4, the flow rate adjustment mechanism 7 according to the present embodiment is configured such that, in a connection position of each nozzle vane 6 with a hub-side wall surface 5a of the hub-side wall surface 5a and a shroud-side wall surface 5b which define the nozzle passage 4, one nozzle vane 6 and its circumferentially adjacent nozzle vane 6 are placed at different distances from the axis O1 in the radial direction.

Thus, when circumferentially adjacent nozzle vanes 6 (6a, 6b) are disposed at different radial positions in the connection position with the hub-side wall surface 5a, the outflow angle $\theta2$ defined by the minimum nozzle throat th can be increased to direct the exhaust gas G1 radially inward, and the outflow angle fluctuation due to the pressure fluctuation can be increased.

Therefore, with the turbocharger 1 and the turbine 2 according to the present embodiment, it is possible to greatly improve the blade incidence characteristics more than before by using only low solidity nozzles 6 without using variable nozzles having a complicated structure when the pressure at the turbine inlet fluctuates greatly due to the exhaust pulsation of the engine, and it is possible to improve the turbine efficiency.

Further, in the present embodiment, the plurality of nozzle vanes 6 includes first nozzle vanes (first low solidity nozzle vanes) 6a and second nozzle vanes (second low solidity nozzle vanes) 6b which are arranged alternately in the circumferential direction. The plurality of first nozzle vanes 6a and the plurality of second nozzle vanes 6b are arranged concentrically, and the second nozzle vanes 6b are disposed radially inward of the first nozzle vanes 6a with a predetermined distance.

In other words, in the flow rate adjustment mechanism 7 according to the present embodiment, the adjacent first nozzle vane 6a and second nozzle vane 6b are arranged such that the trailing edge 6d of the second nozzle vane 6b is disposed radially inward of the trailing edge 6d of the first nozzle vane 6a in the connection position with the hub-side wall surface 5a.

With this configuration, the outflow angle fluctuation due to the pressure fluctuation can be increased more suitably. Thus, it is possible to greatly improve the blade incidence characteristics more than before, and it is possible to improve the turbine efficiency.

Further, the adjacent first nozzle vane 6a and second nozzle vane 6b may be arranged such that the trailing edge 6d of the second nozzle vane 6b is disposed radially inward of the trailing edge 6d of the first nozzle vane 6a in the connection position with the hub-side wall surface 5a, while the trailing edge 6d of each of the first nozzle vanes 6a is disposed radially inward of the trailing edge 6d of each of the second nozzle vanes 6b in the connection position with the shroud-side wall surface 5b.

With this configuration, the outflow angle is prevented from varying in the circumferential direction due to the pressure fluctuation at the nozzle outlet, and the outflow angle fluctuation can be made uniform in the circumferential direction. Accordingly, the outflow angle fluctuation due to the pressure fluctuation can be increased more suitably. Thus, it is possible to greatly improve the blade incidence characteristics more than before, and it is possible to improve the turbine efficiency.

The second nozzle vane 6b disposed on the radially inner side may be disposed radially outward of the extension line R of the outflow angle $\theta1$ of the adjacent first nozzle vane 6a.

With this configuration, since the second nozzle vane 6b is disposed radially outward of the extension line R of the outflow angle $\theta1$ of the adjacent first nozzle vane 6a, it is possible to suppress a large decrease in aerodynamic performance, and it is possible to obtain the effect of increasing the outflow angle fluctuation.

Second Embodiment

Next, the turbocharger and the turbine according to the second embodiment will be described with references to FIGS. 5 to 7 (FIGS. 1, 2, and 3). The turbocharger and the turbine according to the present embodiment differ from the turbocharger and the turbine according to the first embodiment in the shape and arrangement of the nozzle vanes of the flow rate adjustment mechanism, and the other configurations are the same. Therefore, in the present embodiment, the same configurations (e.g., configuration of flow rate adjustment mechanism) as those in the first embodiment are associated with the same reference characters and thus not described again in detail.

The flow rate adjustment mechanism 7 of the turbocharger 1 and the turbine 2 according to the present embodiment is configured such that the first nozzle vanes 6a and the second nozzle vanes 6b, which are arranged alternately adjacent to each other in the circumferential direction, are disposed at different radial positions, as in the first embodiment.

Here, if the plurality of first nozzle vanes 6a and the plurality of second nozzle vanes 6b are arranged concentrically, and the second nozzle vanes 6b are disposed radially inward of the first nozzle vanes 6a with a predetermined distance as in the first embodiment, as shown in FIG. 3, in particular, the outflow angle θ2 (outflow angle θ2 at the nozzle outlet) of the exhaust gas G1 flowing through the respective throats th may have a distribution due to the pressure fluctuation, i.e., variation in magnitude.

Figure 5:
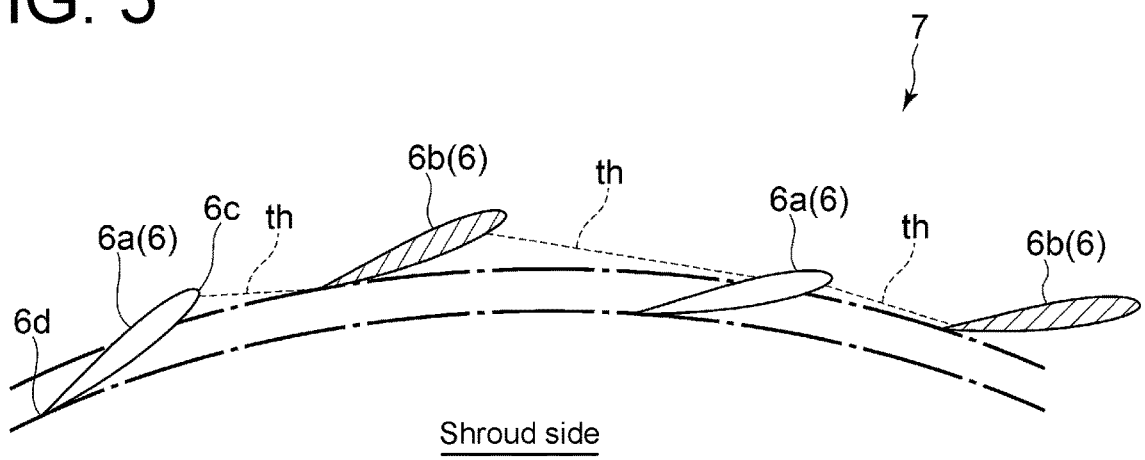
FIG. 5 is a diagram showing a flow rate adjustment mechanism of a turbine according to the second embodiment and shows the arrangement of nozzle vanes (first nozzle vanes and second nozzle vanes) when viewed from the shroud side.
Figure 6:
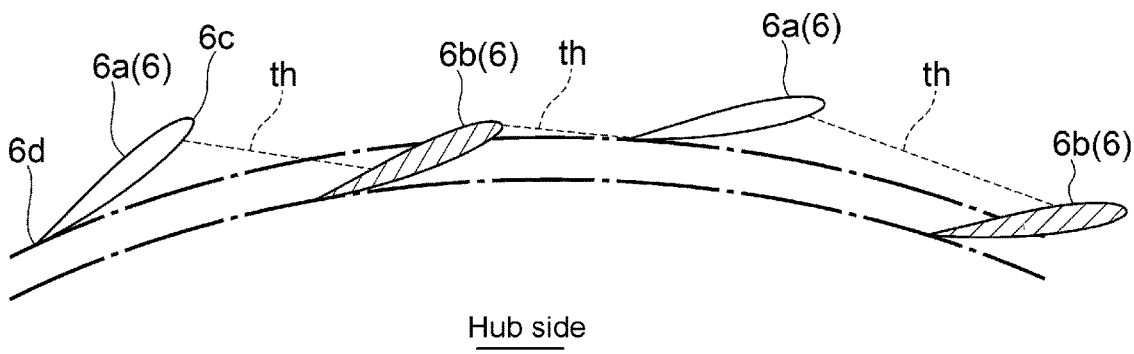
FIG. 6 is a diagram showing a flow rate adjustment mechanism of a turbine according to the second embodiment and shows the arrangement of nozzle vanes (first nozzle vanes and second nozzle vanes) when viewed from the shroud side.
Figure 7:
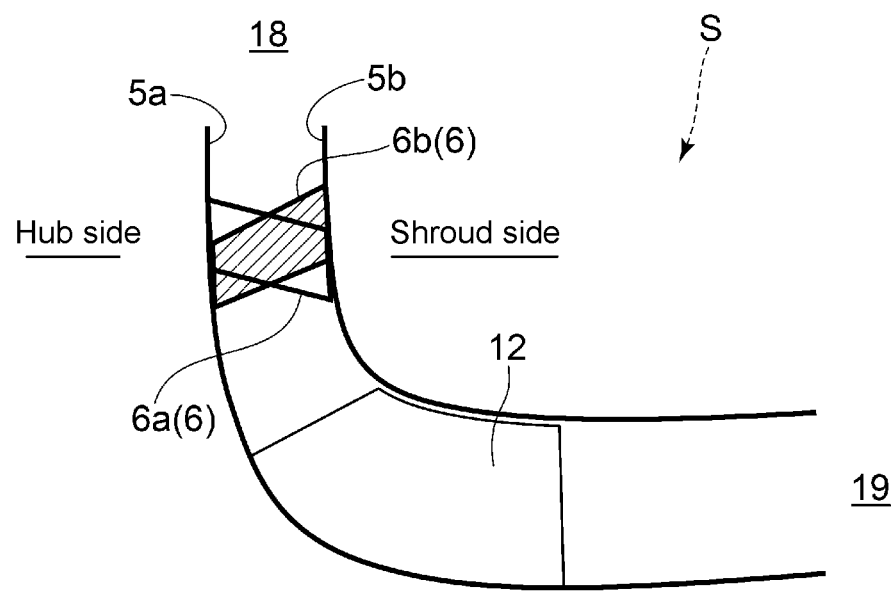
FIG. 7 is a diagram showing the turbine according to the second embodiment and the flow rate adjustment mechanism of the turbine and shows S portion in FIG. 1.

In contrast, in the flow rate adjustment mechanism 7 according to the present embodiment, as shown in FIGS. 5, 6, and 7 (see FIGS. 1 and 2), in addition to the configuration in which the first nozzle vanes 6a and the second nozzle vanes 6b, which are arranged alternately adjacent to each other in the circumferential direction, are disposed at different radial positions, the first nozzle vanes 6a are disposed radially inward of the second nozzle vanes 6b on the shroud side, and conversely, the second nozzle vanes 6b are disposed radially inward of the first nozzle vanes 6a on the hub side in order to make the outflow angle θ2 uniform.

In the turbocharger 1 and the turbine 2 according to the present embodiment having this configuration, as compared to the first embodiment, the outflow angle is prevented from varying in the circumferential direction due to the pressure fluctuation at the nozzle outlet.

In other words, by changing the nozzle radial position in the nozzle height direction, the outflow angle fluctuation at the nozzle inlet can be made uniform in the circumferential direction.

Thus, with the turbocharger 1 and the turbine 2 according to the present embodiment, in addition to the effect of the first embodiment, the outflow angle fluctuation at the nozzle inlet can be made uniform in the circumferential direction, and further, the pressure fluctuation at the turbine inlet can be reduced. Therefore, it is possible to greatly improve the blade incidence characteristics by using only low solidity nozzles without using variable nozzles having a complicated structure, and it is possible to further improve the turbine efficiency more than before.

Here, as shown in FIG. 7, for example, the first nozzle vane 6a may be arranged with the shroud side upstream and the hub side downstream in the exhaust gas flow direction, and in the opposite way to the first nozzle vane 6a, the second nozzle vane 6b may be arranged with the shroud side downstream and the hub side upstream in the exhaust gas flow direction, so that the adjacent first nozzle vane 6a and second nozzle vane 6b are arranged in an X shape when viewed from the direction perpendicular to the exhaust gas flow direction.

In this case, the outflow angle is more effectively prevented from varying in the circumferential direction due to the pressure fluctuation at the nozzle outlet, and the outflow angle fluctuation at the nozzle outlet can be made uniform in the circumferential direction.

Incidentally, in the present embodiment, the trailing edge 6c of each of the first nozzle vanes 6a is disposed radially inward of the trailing edge 6c of each of the second nozzle vanes 6b in the connection position with the shroud-side wall surface 5b.

Further, the radial position of the trailing edge 6c of each of the first nozzle vanes 6a in the connection position with the hub-side wall surface 5a is the same as the radial position of the trailing edge 6c of each of the second nozzle vanes 6b in the connection position with the shroud-side wall surface 5b.

Further, the radial position of the trailing edge 6c of each first nozzle vane 6a in the connection position with the shroud-side wall surface 5b is the same as the radial position of the trailing edge 6c of each second nozzle vane 6b in the connection position with the hub-side wall surface 5a.

Third Embodiment

Next, the turbocharger and the turbine according to the third embodiment will be described with references to FIGS. 8 and 9 (FIGS. 1, 2, and 3). The turbocharger and the turbine according to the present embodiment differ from the first and second embodiments in the shape of the nozzle vanes of the flow rate adjustment mechanism, and the other configurations are the same. Therefore, in the present embodiment, the same configurations (e.g., configuration of flow rate adjustment mechanism) as those in the first and second embodiments are associated with the same reference characters and thus not described again in detail.

In the turbocharger 1 and the turbine 2 according to the present embodiment, the flow rate adjustment mechanism 7 includes the first nozzle vanes 6a and the second nozzle vanes 6b which are disposed at different radial positions, as in the first and second embodiments.

Figure 8:
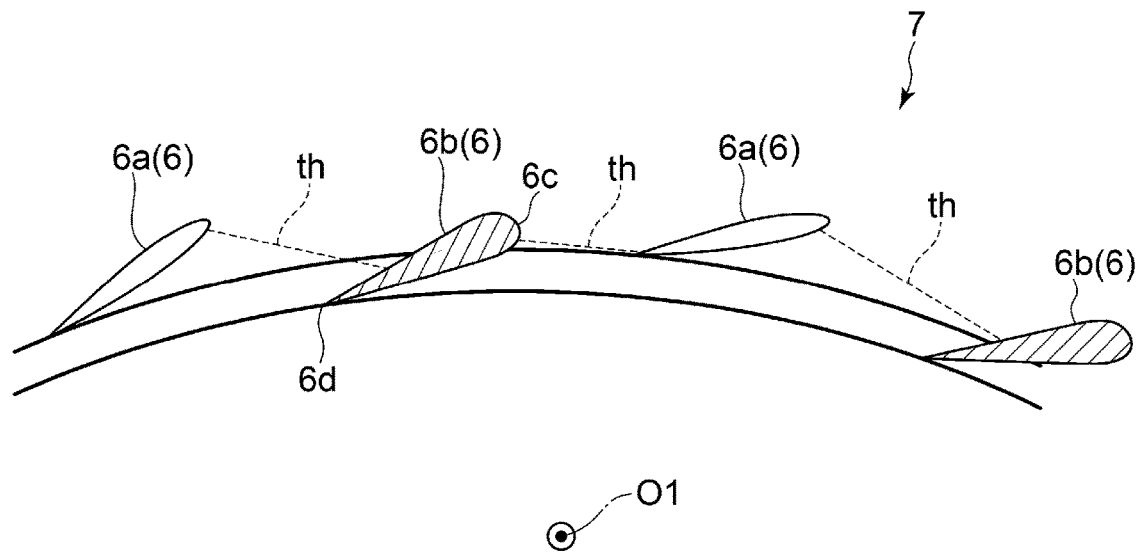
FIG. 8 is a diagram showing a flow rate adjustment mechanism of a turbine according to the third embodiment and shows the shape and the arrangement of nozzle vanes (first nozzle vanes and second nozzle vanes).
Figure 9:
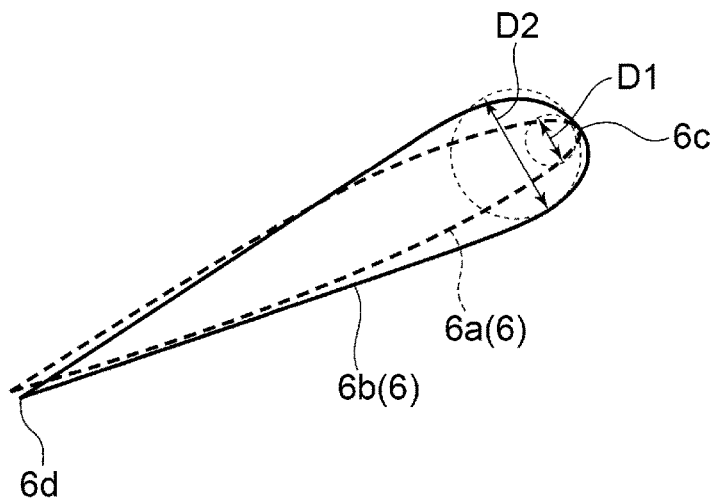
FIG. 9 is a diagram showing the turbine according to the third embodiment and the nozzle vanes (first nozzle vanes and second nozzle vanes) of the flow rate adjustment mechanism of the turbine.

On the other hand, as shown in FIGS. 8 and 9, in the flow rate adjustment mechanism 7 according to the present embodiment, in the connection position with the hub-side wall surface 5a, each of the second nozzle vanes 6b has a larger leading edge portion diameter than that of each of the first nozzle vanes 6a.

Further, in the present embodiment, each nozzle vane 6 is formed so as to satisfy a relationship of D2≤3×D1, where D1 is the leading edge portion diameter of each of the first nozzle vanes 6a, and D2 is the leading edge portion diameter of each of the second nozzle vanes 6b, i.e., the leading edge portion diameter D2 of the second nozzle vane 6b on the radially inner side is set large within a range of 3 times the leading edge portion diameter D1 of the first nozzle vane 6a on the radially outer side. Preferably, the leading edge portion diameter D2 of the second nozzle vane 6b is 1.5 times or more the leading edge portion diameter D1 of the first nozzle vane 6a.

Here, the leading edge portion diameter D1 of the first nozzle vane 6a is defined as the diameter of a virtual circle having the maximum thickness dimension D1 in the leading edge portion of the first nozzle vane 6a as the diameter. Further, the leading edge portion diameter D2 of the second nozzle vane 6b is defined as the diameter of a virtual circle having the maximum thickness dimension D2 in the leading edge portion of the second nozzle vane 6b as the diameter.

Further, the "leading edge portion" in the present disclosure refers to a portion in the range of 0 to 20% along the chord length of the nozzle vane 6 when the leading edge 6c of the nozzle vane 6 is defined as 0% position, and the trailing edge 6d of the nozzle vane 6 is defined as 100% position.

In the turbocharger 1 and the turbine 2 according to the present embodiment having this configuration, since the leading edge portion of the second nozzle vane 6b located on the radially inner side is larger than the leading edge portion of the first nozzle vane 6a located on the radially outer side, the outflow angle θ2 defined by the minimum nozzle throat th can be directed radially inward, so that the outflow angle fluctuation due to the pressure fluctuation can be increased.

Further, by setting the leading edge portion diameter D2 of the second nozzle vane 6b on the radially inner side to be large within the range of 3 times the leading edge portion diameter D1 of the first nozzle vane 6a on the radially outer side, it is possible to obtain the effect of increasing the outflow angle fluctuation while suppressing the increase in aerodynamic loss.

The effect by setting the leading edge portion diameter D2 of the second nozzle vane 6b on the radially inner side within 3 times the leading edge portion diameter D1 of the first nozzle vane 6a on the radially outer side has been confirmed by diligent research.

Therefore, with the turbocharger 1 and the turbine 2 according to the present embodiment, the pressure fluctuation at the turbine inlet can be reduced compared to the first embodiment. Thus, it is possible to greatly improve the blade incidence characteristics by using only low solidity nozzles 6 without using variable nozzles having a complicated structure, and it is possible to further improve the turbine efficiency.

Fourth Embodiment

Next, the turbocharger and the turbine according to the fourth embodiment will be described with references to FIGS. 10 and 11 (FIGS. 1 and 2). The turbocharger and the turbine according to the present embodiment differ from the turbocharger and the turbine according to the first embodiment in the shape and arrangement of the nozzle vanes of the flow rate adjustment mechanism, and the other configurations are the same. Therefore, in the present embodiment, the same configurations (e.g., configuration of flow rate adjustment mechanism) as those in the first embodiment are associated with the same reference characters and thus not described again in detail.

Figure 10:
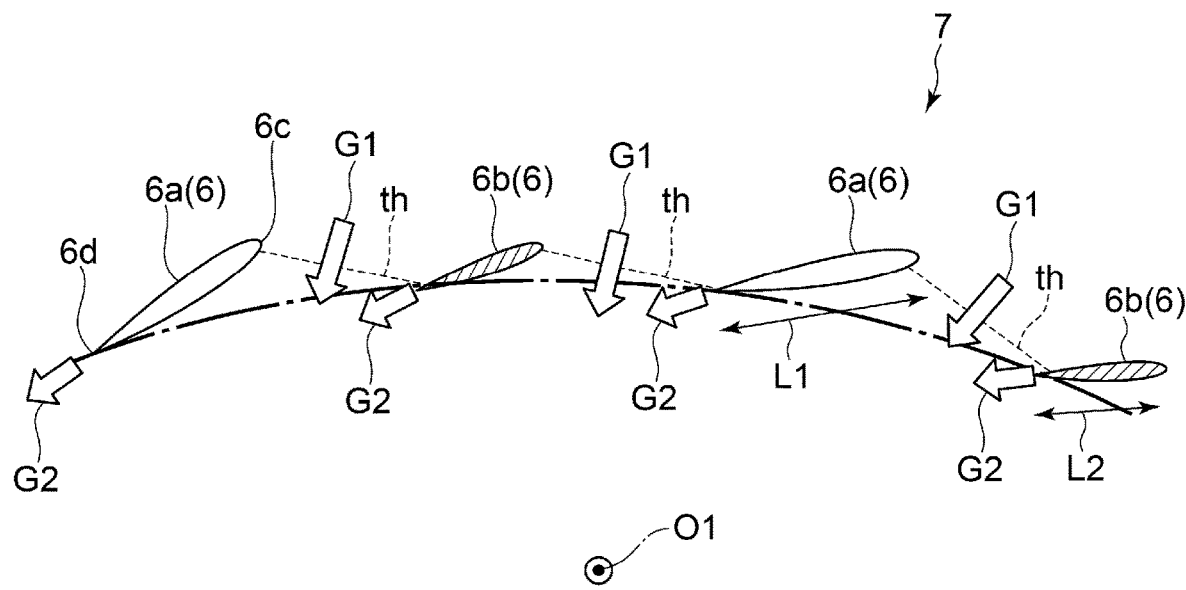
FIG. 10 is a diagram showing a flow rate adjustment mechanism of a turbine according to the fourth embodiment and shows the shape and the arrangement of nozzle vanes (first nozzle vanes and second nozzle vanes).
Figure 11:
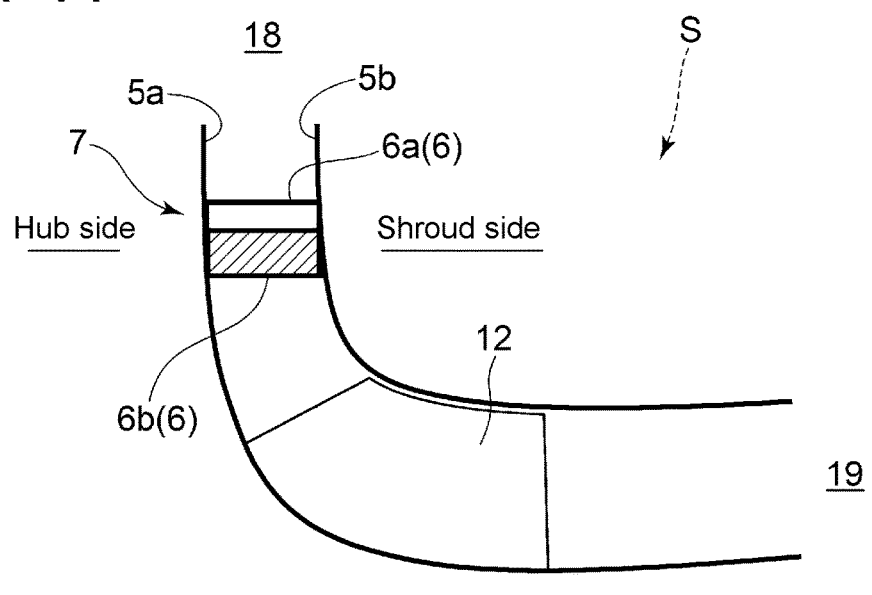
FIG. 11 is a diagram showing the turbine according to the fourth embodiment and the flow rate adjustment mechanism of the turbine and shows S portion in FIG. 1.

As shown in FIGS. 10 and 11, the flow rate adjustment mechanism 7 of the turbocharger 1 and the turbine 2 according to the present embodiment is configured with the first nozzle vanes 6a and the second nozzle vanes 6b which are arranged alternately adjacent to each other in the circumferential direction, as in the first embodiment.

On the other hand, in the flow rate adjustment mechanism 7 according to the present embodiment, the second nozzle vane 6 is formed such that the chord length L2 thereof is smaller than the chord length L1 of the first nozzle vane 6a.

In other words, in the connection position with the hub-side wall surface 5a, each of the first nozzle vanes 6a has a shorter chord length than that of each of the second low solidity nozzle vanes 6a.

Further, in the present embodiment, the plurality of nozzle vanes 6 including the first nozzle vanes 6a and the second nozzle vanes 6b with different sizes is arranged such that the trailing edges are placed on concentric circles.

In the turbocharger 1 and the turbine 2 according to the present embodiment having this configuration, since the chord length L2 of the second nozzle vane 6b is shorter than the chord length L1 of the first nozzle vane 6a, in addition to the effects of the first and second embodiments (the effects by arranging alternately the first nozzle vanes 6a and the second nozzle vanes 6b with a shorter chord length L2), the outflow angle θ2 defined by the minimum nozzle throat th can be directed radially inward.

Thus, the outflow angle θ2 defined by the minimum nozzle throat th can be increased to direct the exhaust gas G1 radially inward, and the outflow angle fluctuation due to the pressure fluctuation can be increased.

Therefore, with the turbocharger 1 and the turbine 2 according to the present embodiment, it is possible to greatly improve the blade incidence characteristics more than before by using only low solidity nozzles 6 without using variable nozzles having a complicated structure when the pressure at the turbine inlet fluctuates greatly due to the exhaust pulsation of the engine, and it is possible to improve the turbine efficiency.

Further, in the present embodiment, the chord length L2 of the second nozzle vane 6b is 80% or less of the chord length L1 of the first nozzle vane 6a.

With this configuration, the outflow angle θ2 defined by the minimum nozzle throat th can be directed radially inward, and the outflow angle θ2 defined by the minimum nozzle throat th can be increased to direct the exhaust gas G1 radially inward, and the outflow angle fluctuation due to the pressure fluctuation can be increased, more effectively.

Figure 12:
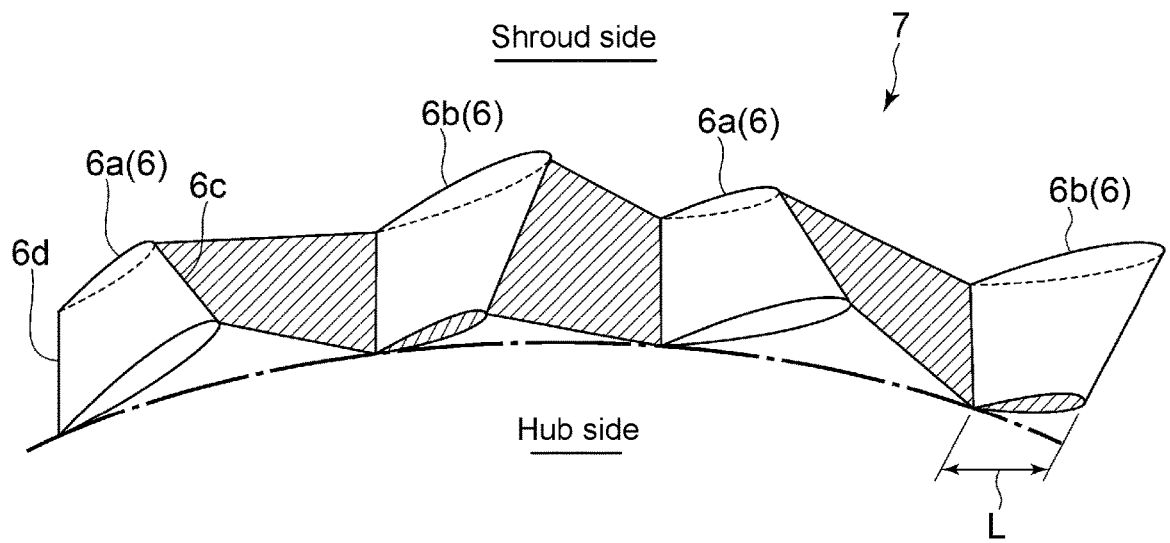
FIG. 12 is a diagram showing a modified example of the flow rate adjustment mechanism of the turbine according to the fourth embodiment and shows the shape and the arrangement of nozzle vanes (first nozzle vanes and second nozzle vanes).
Figure 13:
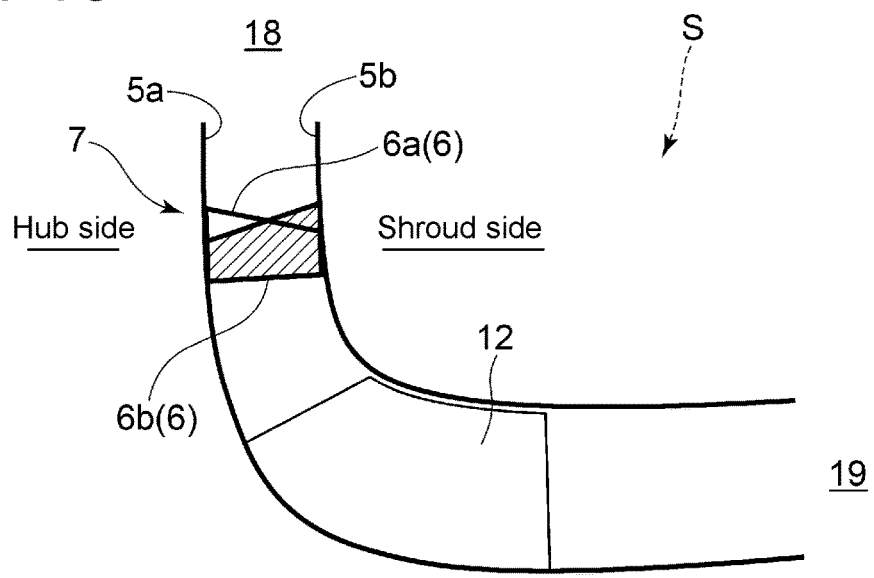
FIG. 13 is a diagram showing a modified example of the turbine according to the fourth embodiment and the flow rate adjustment mechanism of the turbine and shows S portion in FIG. 1.

Here, for example, as shown in FIGS. 12 and 13, the nozzle vane 6 may be formed such that the chord length L on the shroud side differs from the chord length L on the hub side. In this case, it is preferable to arrange the plurality of nozzle vanes 6 in the circumferential direction such that the chord lengths L on the shroud side and the hub side alternately decrease and increase.

In this configuration, similarly, the outflow angle θ2 defined by the minimum nozzle throat th can be directed radially inward to direct the exhaust gas G1 radially inward, and the outflow angle fluctuation due to the pressure fluctuation can be increased.

Therefore, it is possible to greatly improve the blade incidence characteristics more than before by using only low solidity nozzles 6 without using variable nozzles having a complicated structure when the pressure at the turbine inlet fluctuates greatly due to the exhaust pulsation of the engine, and it is possible to improve the turbine efficiency.

Fifth Embodiment

Next, the turbocharger and the turbine according to the fifth embodiment will be described with references to FIGS. 14 and 15 (FIGS. 1, 2, and 3). The turbocharger and the turbine according to the present embodiment differ from the turbocharger and the turbine according to the first to fourth embodiments in the shape and arrangement of the nozzle vanes of the flow rate adjustment mechanism, and the other configurations are the same. Therefore, in the present embodiment, the same configurations (e.g., configuration of flow rate adjustment mechanism) as those in the first to fourth embodiments are associated with the same reference characters and thus not described again in detail.

Figure 14:
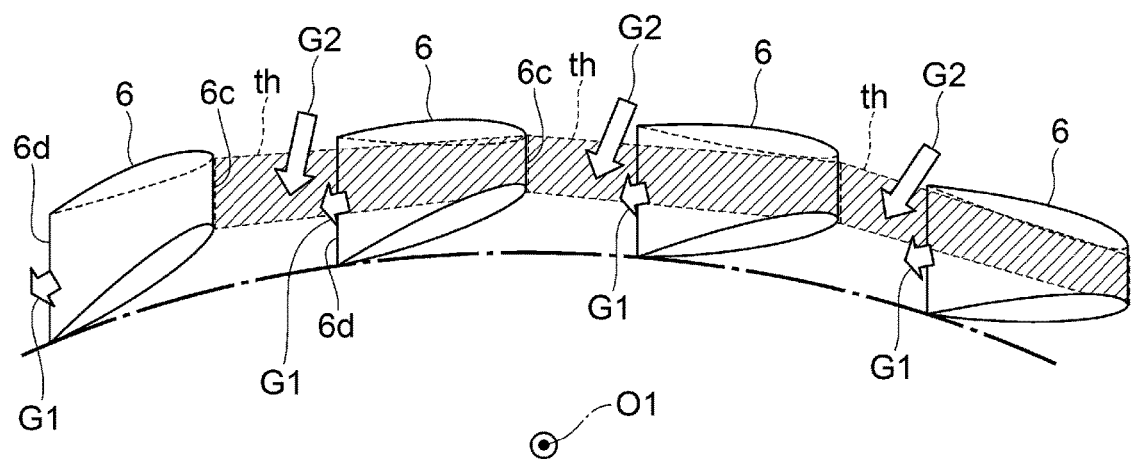
FIG. 14 is a diagram showing a flow rate adjustment mechanism of a turbine according to the fifth embodiment and shows the shape and the arrangement of nozzle vanes.
Figure 15:
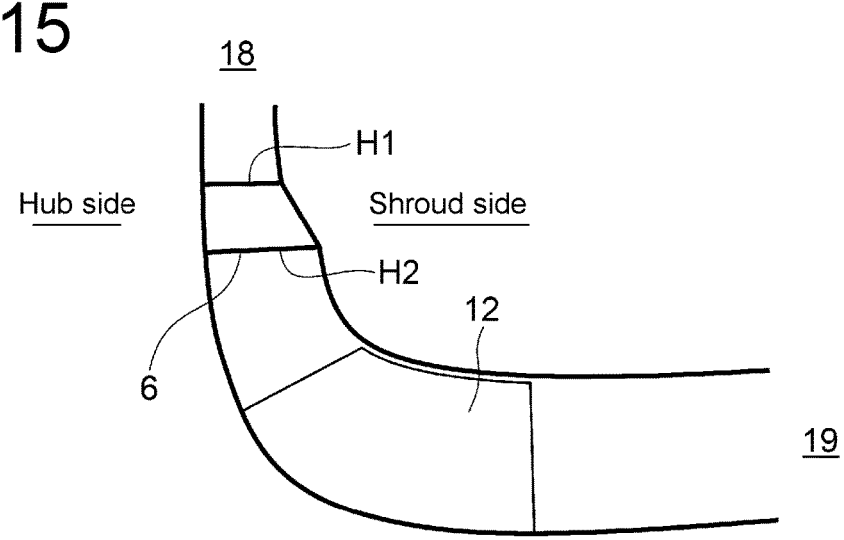
FIG. 15 is a diagram showing the turbine according to the fifth embodiment and the flow rate adjustment mechanism of the turbine and shows S portion in FIG. 1.

The flow rate adjustment mechanism 7 of the turbocharger 1 and the turbine 2 according to the present embodiment is configured with a plurality of nozzle vanes 6 arranged at an interval in the circumferential direction, as shown in FIGS. 14 and 15 (see FIGS. 1 and 2).

On the other hand, in the flow rate adjustment mechanism 7 according to the present embodiment, each nozzle vane 6 is formed such that the blade height H1 of the leading edge is smaller than the blade height H2 of the trailing edge.

In the present embodiment, the shroud-side end portion (the connection position with the shroud-side wall surface) of the nozzle vane 6 is cut obliquely such that the blade height H1 of the leading edge 6c is decreased. When the nozzle vane 6 is formed in this way, as shown in FIG. 15, the nozzle passage 4 is formed in accordance with the shape of the nozzle vane 6.

Further, in the present embodiment, the nozzle vanes 6 are arranged such that the trailing edges 6d are placed on concentric circles.

In the turbocharger 1 and the turbine 2 according to the present embodiment having this configuration, since each nozzle vane (low solidity nozzle vane) 6 is formed to have a smaller blade height H1 at the leading edge 6c such that the nozzle inlet height is larger than the nozzle outlet, that is, the minimum nozzle area is at the nozzle inlet side, the outflow angle θ2 defined by the minimum nozzle throat th can be directed radially inward, and the outflow angle fluctuation due to the pressure fluctuation can be increased (see FIG. 3).

Therefore, with the turbocharger 1 and the turbine 2 according to the present embodiment, it is possible to greatly improve the blade incidence characteristics more than before by using only low solidity nozzles 6 without using variable nozzles having a complicated structure when the pressure at the turbine inlet fluctuates greatly due to the exhaust pulsation of the engine, and it is possible to improve the turbine efficiency.

Further, when the nozzle vane 6 is formed such that the blade height H1 of the leading edge 6c is 80% or less of the blade height H2 of the trailing edge 6d (H1≤0.8×H2), the above-described effects can be obtained more reliably and suitably.

Sixth Embodiment

Next, the turbocharger and the turbine according to the sixth embodiment will be described with references to FIG. 16 (FIGS. 1, 2, and 3). The turbocharger and the turbine according to the present embodiment differ from the turbocharger and the turbine according to the first to fifth embodiments in the shape of the nozzle vanes of the flow rate adjustment mechanism. Therefore, in the present embodiment, the same configurations (configuration of flow rate adjustment mechanism) as those in the first to fifth embodiments are associated with the same reference characters and thus not described again in detail.

Figure 16:
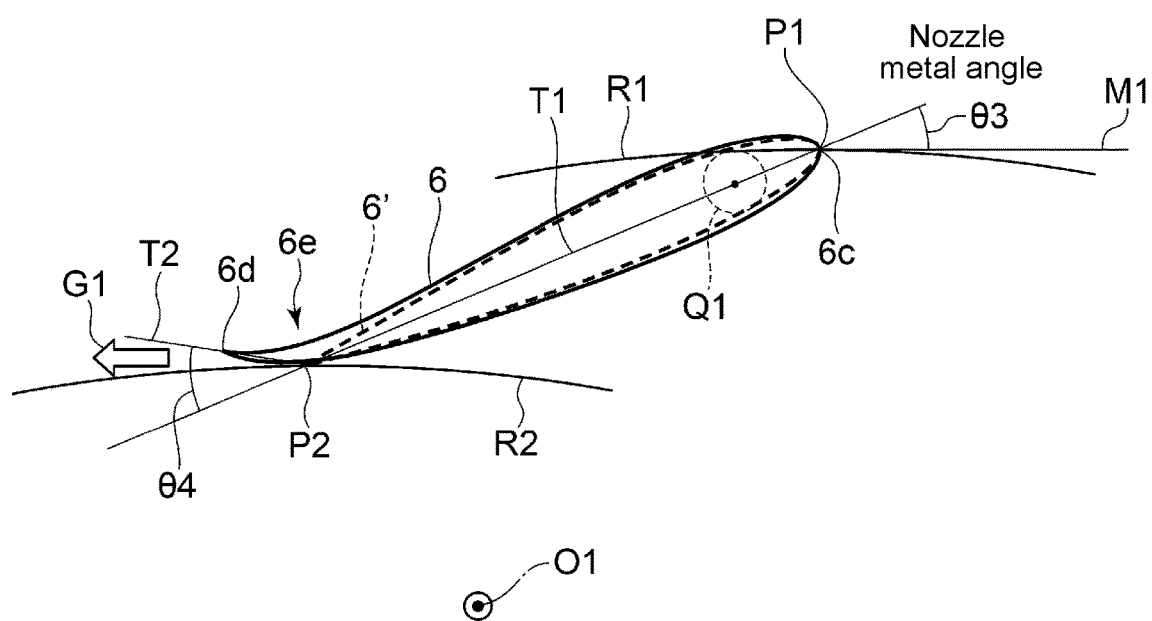
FIG. 16 is a diagram showing the shape of nozzle vanes of a flow rate adjustment mechanism of a turbine according to the sixth embodiment.

As shown in FIG. 16, in the flow rate adjustment mechanism 7 according to the present embodiment, the trailing edge portion of the nozzle vane 6 is curved in the circumferential direction. Further, in the present embodiment, the curved portion (trailing edge curved portion) 6e of the nozzle vane 6 is formed with an angle difference of at most 200 with respect to the nozzle metal angle (leading edge metal angle) θ3.

More specifically, the nozzle metal angle θ3 in the present embodiment refers to an intersection angle θ3 between a tangent line MI at an intersection P1 between the leading edge 6c of the nozzle vane 6 and a concentric circle R1 passing through the leading edges 6c of the plurality of nozzle vanes 6 and a straight line (central axis of the nozzle vane 6) connecting the intersection P1 and the center of an incircle Q1 in contact with the front surface on the pressure side and the back surface on the suction side of the nozzle vane 6.

The curvature angle θ4 of the curved portion 6e at the trailing edge 6c of the nozzle vane 6 refers to an intersection angle θ4 between an extension of a straight line T1 connecting the intersection P1 and the center of the incircle Q1 of the nozzle vane 6 and a central axis T2 of the nozzle vane 6 at the curved portion 6e (or a straight line T2 connecting the trailing edge of the nozzle vane 6 having the curved portion 6e (trailing edge of the curved portion 6e) and an intersection P2 between a concentric circle R2 passing through the trailing edges of a plurality of nozzle vanes 6' not having the curved portion 6e and the trailing edge of this nozzle vane 6').

As described above, in order to increase the nozzle outflow angle fluctuation due to the pressure fluctuation, it is necessary to eliminate the nozzle overlap and increase the difference between the nozzle geometric outflow angle θ1 and the outflow angle θ2 defined by the minimum nozzle throat th.

In contrast, in the flow rate adjustment mechanism 7 according to the present embodiment, as described above, the trailing edge 6d is curved in the circumferential direction to form the nozzle vane 6.

With this configuration, the curved portion 6e of the nozzle vane 6 extending in the circumferential direction decreases the geometric nozzle outflow angle θ1, that is, increase the difference between the nozzle geometric outflow angle θ1 and the outflow angle θ2 defined by the minimum nozzle throat th, so that the outflow angle fluctuation due to the pressure fluctuation can be increased.

Thus, with the turbocharger 1 and the turbine 2 according to the present embodiment, the pressure fluctuation at the turbine inlet can be reduced. Therefore, it is possible to greatly improve the blade incidence characteristics by using only low solidity nozzles without using variable nozzles having a complicated structure, and it is possible to further improve the turbine efficiency more than before.

Further, in the present embodiment, the curvature angle θ4 of the curved portion 6e of the nozzle vane 6 is set to satisfy the nozzle metal angle θ3<θ4≤θ3+20°. Preferably, the curvature angle θ4 satisfies θ3+10°≤θ4≤θ3+20°.

Thus, when the curved portion 6e of the trailing edge of the nozzle vane 6 is formed with an angle difference of at most 20° (20° or less) with respect to the nozzle metal angle θ3, the outflow angle fluctuation due to the pressure change can be increased more effectively.

The first to sixth embodiments of the turbocharger and the turbine have been described above, but the present disclosure is not limited to the first to sixth embodiments, and the configurations and modifications of these embodiments may be appropriately combined without departing from the spirit of the present disclosure.

Further improvement of the blade incidence characteristics and turbine efficiency can be achieved synergistically by selectively combining the configurations and modifications of the first through sixth embodiments as appropriate.

Figure 17:
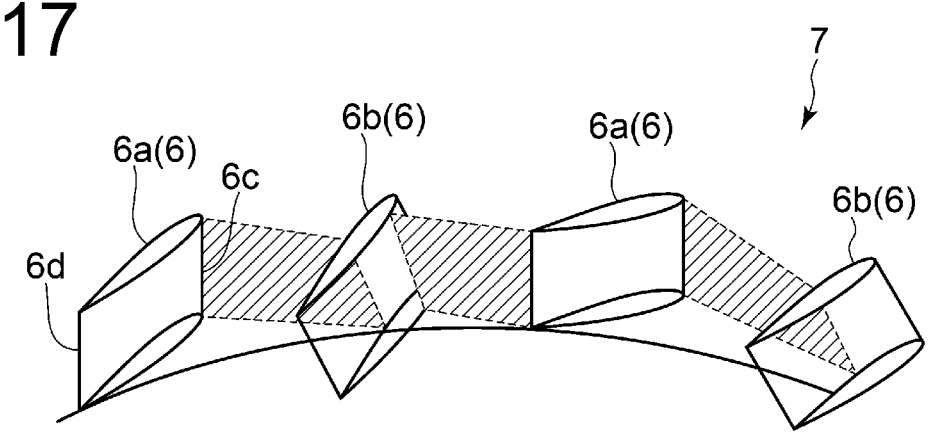
FIG. 17 is a diagram showing a modified example combining the configurations of the plurality of nozzle vanes (first nozzle vanes and second nozzle vanes) according to the above-described embodiments.

For example, as shown in FIG. 17, the radial positions of the first nozzle vanes 6a and the second nozzle vanes 6b may be changed, and the nozzle metal angle θ3 may be changed.

In this case, in addition to the effect by changing the radial positions of the first nozzle vanes 6a and the second nozzle vanes 6b, by changing the nozzle metal angle θ3, the angle of the minimum nozzle throat can be reduced (the minimum nozzle throat is laid down), and the throat area can be increased. Thus, the outflow angle fluctuation can be effectively increased while suppressing the increase in aerodynamic loss, and the outflow angle fluctuation due to the pressure fluctuation can be increased. Accordingly, it is possible to greatly improve the blade incidence characteristics, and it is possible to improve the turbine efficiency.

Figure 18:
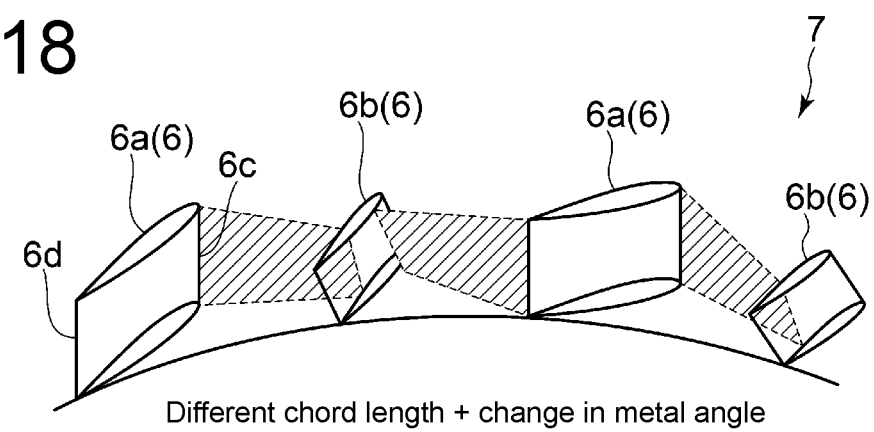
FIG. 18 is a diagram showing a modified example combining the configurations of the plurality of nozzle vanes (first nozzle vanes and second nozzle vanes) according to the above-described embodiments.

Further, for example, as shown in FIG. 18, the chord lengths L of the first nozzle vanes 6a and the second nozzle vanes 6b may be changed, and the nozzle metal angle θ3 may be changed.

In this case, in addition to the effect by changing the chord lengths L of the first nozzle vanes 6a and the second nozzle vanes 6b, by changing the nozzle metal angle θ3, the angle of the minimum nozzle throat can be reduced, and the throat area can be increased. Thus, the outflow angle fluctuation can be effectively increased while suppressing the increase in aerodynamic loss, and the outflow angle fluctuation due to the pressure fluctuation can be increased. Accordingly, similarly, it is possible to greatly improve the blade incidence characteristics, and it is possible to improve the turbine efficiency.

Figure 19:
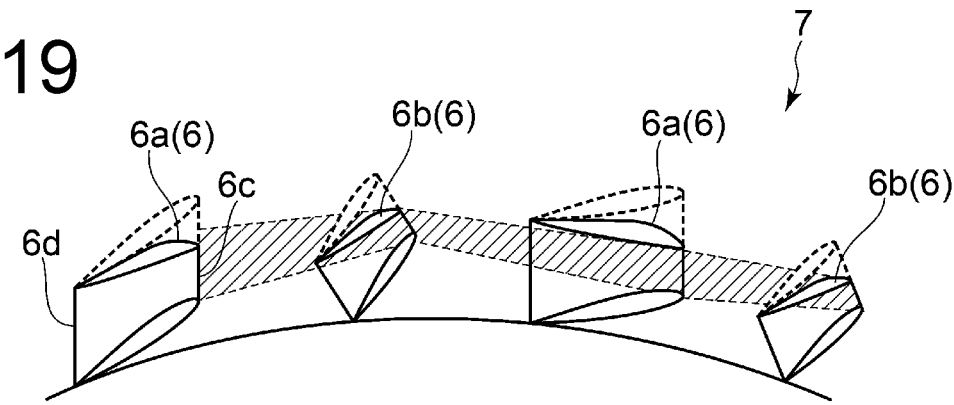
FIG. 19 is a diagram showing a modified example combining the configurations of the plurality of nozzle vanes (first nozzle vanes and second nozzle vanes) according to the above-described embodiments.

Further, for example, as shown in FIG. 19, the blade heights of the leading edges 6c of the first nozzle vanes 6a and the second nozzle vanes 6b may be changed, and the nozzle metal angle θ3 may be changed.

In this case, in addition to the effect by changing the blade heights of the leading edges 6c of the first nozzle vanes 6a and the second nozzle vanes 6b, by changing the nozzle metal angle θ3, the angle of the minimum nozzle throat can be reduced, and the throat area can be increased. Thus, the outflow angle fluctuation can be effectively increased while suppressing the increase in aerodynamic loss, and the outflow angle fluctuation due to the pressure fluctuation can be increased. Accordingly, similarly, it is possible to greatly improve the blade incidence characteristics, and it is possible to improve the turbine efficiency.

In other words, further improvement of the blade incidence characteristics and turbine efficiency can be achieved by selectively combining the configurations and modifications of the first through sixth embodiments as appropriate.

More specifically, the contents described in the above embodiments would be understood as follows, for instance.

(1) A turbine according to an aspect of the present disclosure (turbine 2 according to the first embodiment) is provided with: a turbine wheel (turbine wheel 14 according to the first embodiment: FIG. 1) configured to rotate about an axis; a turbine housing (turbine housing 5 according to the first embodiment: FIG. 1) accommodating the turbine wheel and defining an annular nozzle passage (nozzle passage 4 according to the first embodiment: FIG. 1) on an outer peripheral side of the turbine wheel; and a plurality of low solidity nozzle vanes (nozzle vanes 6, first nozzle vanes 6a, second nozzle vanes 6b according to the first, second and third embodiments) arranged in the nozzle passage at an interval in a circumferential direction. Circumferentially adjacent low solidity nozzle vanes are disposed at different radial positions in a connection position of each of the low solidity nozzle vanes with a hub-side wall surface (hub-side wall surface 5a according to the first embodiment) of the hub-side wall surface and a shroud-side wall surface (shroud-side wall surface 5b according to the first embodiment) which define the nozzle passage.

According to the turbine of the present disclosure, since circumferentially adjacent low solidity nozzle vanes are disposed at different radial positions in the connection position with the hub-side wall surface, the outflow angle defined by the minimum nozzle throat can be increased to direct the exhaust gas radially inward, and the outflow angle fluctuation due to the pressure fluctuation can be increased. Therefore, it is possible to greatly improve the blade incidence characteristics more than before by using only low solidity nozzles without using variable nozzles having a complicated structure when the pressure at the turbine inlet fluctuates greatly due to the exhaust pulsation of the engine, and it is possible to improve the turbine efficiency.

(2) A turbine according to another aspect is the turbine described in (1) in which the plurality of low solidity nozzle vanes includes: a plurality of first low solidity nozzle vanes; and a plurality of second low solidity nozzle vanes each of which has a trailing edge (trailing edge 6d according to the first embodiment) disposed radially inward of a trailing edge of each of the plurality of first low solidity nozzle vanes in the connection position with the hub-side wall surface. The plurality of first low solidity nozzle vanes and the plurality of second low solidity nozzle vanes are arranged so as to be alternately adjacent to each other in the circumferential direction.

With this configuration, since the plurality of first low solidity nozzle vanes and the plurality of second low solidity nozzle vanes are arranged so as to be alternately adjacent to each other in the circumferential direction, the outflow angle defined by the minimum nozzle throat can be increased to direct the exhaust gas radially inward, and the outflow angle fluctuation due to the pressure fluctuation can be increased suitably. Therefore, when the pressure at the turbine inlet fluctuates greatly due to the exhaust pulsation of the engine, it is possible to greatly improve the blade incidence characteristics more than before by using only low solidity nozzles without using variable nozzles having a complicated structure, and it is possible to improve the turbine efficiency more suitably.

(3) A turbine according to another aspect is the turbine described in (2) in which the trailing edge of each of the plurality of first low solidity nozzle vanes is disposed radially inward of the trailing edge of each of the plurality of second low solidity nozzle vanes in a connection position with the shroud-side wall surface.

With this configuration, since the trailing edge of each of the plurality of first low solidity nozzle vanes is disposed radially inward of the trailing edge of each of the plurality of second low solidity nozzle vanes in the connection position with the shroud-side wall surface, the outflow angle defined by the minimum nozzle throat can be increased to direct the exhaust gas radially inward, and the outflow angle fluctuation due to the pressure fluctuation can be increased more suitably. Therefore, when the pressure at the turbine inlet fluctuates greatly due to the exhaust pulsation of the engine, it is possible to greatly improve the blade incidence characteristics more than before by using only low solidity nozzles without using variable nozzles having a complicated structure, and it is possible to improve the turbine efficiency more suitably.

(4) A turbine according to another aspect is the turbine described in (2) or (3) in which each of the plurality of first low solidity nozzle vanes has a shorter chord length (chord length L1, L2 according to the fourth embodiment) than that of each of the plurality of second low solidity nozzle vanes in the connection position with the hub-side wall surface.

With this configuration, since each of the plurality of first low solidity nozzle vanes has a shorter chord length than that of each of the plurality of second low solidity nozzle vanes in the connection position with the hub-side wall surface, the outflow angle defined by the minimum nozzle throat can be directed radially inward. Thus, the outflow angle defined by the minimum nozzle throat can be increased to direct the exhaust gas radially inward, and the outflow angle fluctuation due to the pressure fluctuation can be increased. Accordingly, it is possible to greatly improve the blade incidence characteristics, and it is possible to improve the turbine efficiency more significantly.

(5) A turbine according to another aspect is the turbine described in (3) in which each of the plurality of second low solidity nozzle vanes has a shorter chord length than that of each of the plurality of first low solidity nozzle vanes in the connection position with the shroud-side wall surface.

With this configuration, since each of the plurality of second low solidity nozzle vanes has a shorter chord length than that of each of the plurality of first low solidity nozzle vanes in the connection position with the shroud-side wall surface, the outflow angle defined by the minimum nozzle throat can be directed radially inward. Thus, the outflow angle defined by the minimum nozzle throat can be increased to direct the exhaust gas radially inward, and the outflow angle fluctuation due to the pressure fluctuation can be increased.

Accordingly, it is possible to greatly improve the blade incidence characteristics, and it is possible to improve the turbine efficiency more significantly.

(6) A turbine according to another aspect is the turbine described in any one of (2) to (5) in which each of the plurality of second low solidity nozzle vanes has a larger leading edge portion diameter (leading edge portion diameter D1, D2 according to the third embodiment) than that of each of the plurality of first low solidity nozzle vanes in the connection position with the hub-side wall surface.

With this configuration, since each of the plurality of second low solidity nozzle vanes has a larger leading edge portion diameter than that of each of the plurality of first low solidity nozzle vanes in the connection position with the hub-side wall surface, the outflow angle fluctuation can be increased effectively. Thus, the outflow angle defined by the minimum nozzle throat can be increased to direct the exhaust gas radially inward, and the outflow angle fluctuation due to the pressure fluctuation can be increased. Accordingly, it is possible to greatly improve the blade incidence characteristics, and it is possible to improve the turbine efficiency more significantly.

(7) A turbine according to another aspect is the turbine described in (6) in which a relationship of D2≤3×D1 is satisfied, where D1 is the leading edge portion diameter of each of the plurality of first low solidity nozzle vanes, and D2 is the leading edge portion diameter of each of the plurality of second low solidity nozzle vanes.

With this configuration, the outflow angle fluctuation can be effectively increased while suppressing the increase in aerodynamic loss, and the outflow angle fluctuation due to the pressure fluctuation can be increased suitably. Accordingly, it is possible to greatly improve the blade incidence characteristics, and it is possible to improve the turbine efficiency significantly.

(8) A turbine according to another aspect is the turbine described in (3) in which each of the plurality of second low solidity nozzle vanes has a larger leading edge portion diameter than that of each of the plurality of first low solidity nozzle vanes in the connection position with the hub-side wall surface, and each of the plurality of first low solidity nozzle vanes has a larger leading edge portion diameter than that of each of the plurality of second low solidity nozzle vanes in the connection position with the shroud-side wall surface.

With this configuration, the outflow angle fluctuation can be increased more effectively. Thus, the outflow angle defined by the minimum nozzle throat can be increased to direct the exhaust gas radially inward, and the outflow angle fluctuation due to the pressure fluctuation can be increased. Accordingly, it is possible to greatly improve the blade incidence characteristics, and it is possible to improve the turbine efficiency more significantly.

(9) A turbine according to another aspect is the turbine described in any one of (2) to (8) in which each of the plurality of second low solidity nozzle vanes has a larger leading edge metal angle (nozzle metal angle θ3 according to the sixth embodiment) than that of the plurality of first low solidity nozzle vanes.

With this configuration, since each of the plurality of second low solidity nozzle vanes has a larger leading edge metal angle than that of the plurality of first low solidity nozzle vanes, the angle of the minimum nozzle throat can be reduced (the minimum nozzle throat is laid down), and the throat area can be increased. Thus, the outflow angle fluctuation can be effectively increased while suppressing the increase in aerodynamic loss, and the outflow angle fluctuation due to the pressure fluctuation can be increased. Accordingly, it is possible to greatly improve the blade incidence characteristics, and it is possible to improve the turbine efficiency significantly.

(10) A turbine according to another aspect is the turbine described in any one of (1) to (9) in which each of the plurality of low solidity nozzle vanes is configured such that a blade height (blade height H2 according to the fifth embodiment) of a trailing edge is larger than a blade height (blade height H1 according to the fifth embodiment) of a leading edge (leading edge 6c according to the first embodiment).

With this configuration, the height of the nozzle inlet is larger than that of the nozzle outlet, so that the minimum nozzle area is at the nozzle inlet side. Thus, the outflow angle defined by the area of the minimum nozzle throat can be directed radially inward, and the outflow angle fluctuation due to the pressure fluctuation can be increased. Accordingly, it is possible to greatly improve the blade incidence characteristics, and it is possible to improve the turbine efficiency significantly.

(11) A turbine according to an aspect of the present disclosure is provided with: a turbine wheel configured to rotate about an axis; a turbine housing accommodating the turbine wheel and defining an annular nozzle passage on an outer peripheral side of the turbine wheel; and a plurality of low solidity nozzle vanes arranged in the nozzle passage at an interval in a circumferential direction. Circumferentially adjacent low solidity nozzle vanes have different chord lengths in a connection position of each of the low solidity nozzle vanes with a hub-side wall surface of the hub-side wall surface and a shroud-side wall surface which define the nozzle passage.

With this configuration, since each of the plurality of first low solidity nozzle vanes has a shorter chord length than that of each of the plurality of second low solidity nozzle vanes in the connection position with the hub-side wall surface, the outflow angle defined by the minimum nozzle throat can be directed radially inward. Thus, the outflow angle defined by the minimum nozzle throat can be increased to direct the exhaust gas radially inward, and the outflow angle fluctuation due to the pressure fluctuation can be increased. Accordingly, it is possible to greatly improve the blade incidence characteristics, and it is possible to improve the turbine efficiency.

(12) A turbine according to another aspect is the turbine described in (11) in which the plurality of low solidity nozzle vanes includes: a plurality of first low solidity nozzle vanes; and a plurality of second low solidity nozzle vanes each of which has a shorter chord length than that of each of the plurality of first low solidity nozzle vanes in the connection position with the hub-side wall surface. The plurality of first low solidity nozzle vanes and the plurality of second low solidity nozzle vanes are arranged so as to be alternately adjacent to each other in the circumferential direction.

With this configuration, in addition to the effect of (11), the outflow angle defined by the minimum nozzle throat can be increased to direct the exhaust gas radially inward, and the outflow angle fluctuation due to the pressure fluctuation can be increased more significantly. Therefore, when the pressure at the turbine inlet fluctuates greatly due to the exhaust pulsation of the engine, it is possible to greatly improve the blade incidence characteristics more than before by using only low solidity nozzles without using variable nozzles having a complicated structure, and it is possible to improve the turbine efficiency more suitably.

(13) A turbine according to another aspect is the turbine described in (12) in which a relationship of L2≤0.8 L1 is satisfied, where L1 is the chord length of each of the plurality of first low solidity nozzle vanes, and L2 is the chord length of each of the plurality of second low solidity nozzle vanes.

With this configuration, since a relationship of L2≤0.8× L1 is satisfied, the outflow angle defined by the minimum nozzle throat can be effectively directed radially inward. Thus, the outflow angle fluctuation due to the pressure fluctuation can be increased more suitably. Accordingly, it is possible to greatly improve the blade incidence characteristics, and it is possible to improve the turbine efficiency.

(14) A turbine according to another aspect is the turbine described in (12) or (13) in which each of the plurality of first low solidity nozzle vanes has a shorter chord length than that of each of the plurality of second low solidity nozzle vanes in the connection position with the shroud-side wall surface.

With this configuration, since a relationship of $L2 \leq 0.8 \times L1$ is satisfied, the outflow angle defined by the minimum nozzle throat can be directed radially inward more effectively. Thus, the outflow angle fluctuation due to the pressure fluctuation can be increased significantly. Accordingly, it is possible to greatly improve the blade incidence characteristics, and it is possible to improve the turbine efficiency.

(15) A turbine according to another aspect is the turbine described in (13) or (14) in which each of the plurality of second low solidity nozzle vanes has a larger leading edge portion diameter than that of each of the plurality of first low solidity nozzle vanes in the connection position with the hub-side wall surface.

With this configuration, in addition to the effect of (13) or (14), since each of the plurality of second low solidity nozzle vanes has a larger leading edge portion diameter than that of each of the plurality of first low solidity nozzle vanes in the connection position with the hub-side wall surface, the outflow angle fluctuation can be increased effectively. Thus, the outflow angle defined by the minimum nozzle throat can be increased to direct the exhaust gas radially inward, and the outflow angle fluctuation due to the pressure fluctuation can be increased. Accordingly, it is possible to greatly improve the blade incidence characteristics, and it is possible to improve the turbine efficiency more significantly.

(16) A turbine according to another aspect is the turbine described in (15) in which a relationship of $D2 \leq 3 \times D1$ is satisfied, where D1 is the leading edge portion diameter of each of the plurality of first low solidity nozzle vanes, and D2 is the leading edge portion diameter of each of the plurality of second low solidity nozzle vanes.

With this configuration, in addition to the effect of (13) or (14), the outflow angle fluctuation can be effectively increased while suppressing the increase in aerodynamic loss, and the outflow angle fluctuation due to the pressure fluctuation can be increased suitably. Accordingly, it is possible to greatly improve the blade incidence characteristics, and it is possible to improve the turbine efficiency more significantly.

(17) A turbine according to another aspect is the turbine described in (14) in which each of the plurality of second low solidity nozzle vanes has a larger leading edge portion diameter than that of each of the plurality of first low solidity nozzle vanes in the connection position with the hub-side wall surface, and each of the plurality of first low solidity nozzle vanes has a larger leading edge portion diameter than that of each of the plurality of second low solidity nozzle vanes in the connection position with the shroud-side wall surface.

With this configuration, in addition to the effect of (14), the outflow angle is prevented from varying in the circumferential direction due to the pressure fluctuation at the nozzle outlet, and the outflow angle fluctuation can be made uniform in the circumferential direction. Accordingly, the outflow angle fluctuation due to the pressure fluctuation can be increased more suitably. Thus, it is possible to greatly improve the blade incidence characteristics more than before, and it is possible to improve the turbine efficiency.

(18) A turbine according to another aspect is the turbine described in any one of (11) to (17) in which each of the plurality of second low solidity nozzle vanes has a larger leading edge metal angle than that of the plurality of first low solidity nozzle vanes.

With this configuration, in addition to the effect of any one of (11) to (17), the angle of the minimum nozzle throat can be reduced (the minimum nozzle throat is laid down), and the throat area can be increased. Thus, the outflow angle fluctuation can be effectively increased while suppressing the increase in aerodynamic loss, and the outflow angle fluctuation due to the pressure fluctuation can be increased. Accordingly, it is possible to greatly improve the blade incidence characteristics, and it is possible to improve the turbine efficiency significantly.

(19) A turbine according to another aspect is the turbine described in any one of (11) to (18) in which each of the plurality of low solidity nozzle vanes is configured such that a blade height of a trailing edge is larger than a blade height of a leading edge.

With this configuration, in addition to the effect of any one of (11) to (18), the height of the nozzle inlet is larger than that of the nozzle outlet, so that the minimum nozzle area is at the nozzle inlet side. Thus, the outflow angle defined by the area of the minimum nozzle throat can be directed radially inward, and the outflow angle fluctuation due to the pressure fluctuation can be increased. Accordingly, it is possible to greatly improve the blade incidence characteristics, and it is possible to improve the turbine efficiency significantly.

(20) A turbine according to an aspect of the present disclosure is provided with: a turbine w % heel configured to rotate about an axis; a turbine housing accommodating the turbine wheel and defining an annular nozzle passage on an outer peripheral side of the turbine wheel; and a plurality of low solidity nozzle vanes arranged in the nozzle passage at an interval in a circumferential direction. Each of the plurality of low solidity nozzle vanes is configured such that a blade height of a trailing edge is larger than a blade height of a leading edge.

With this configuration, since each of the plurality of low solidity nozzle vanes is configured such that the blade height of the trailing edge is larger than the blade height of the leading edge, the height of the nozzle inlet is larger than that of the nozzle outlet, so that the minimum nozzle area is at the nozzle inlet side. Thus, the outflow angle defined by the area of the minimum nozzle throat can be directed radially inward, and the outflow angle fluctuation due to the pressure fluctuation can be increased. Accordingly, it is possible to greatly improve the blade incidence characteristics, and it is possible to improve the turbine efficiency.

(21) A turbine according to another aspect is the turbine described in (20) in which a relationship of $H1 \leq 0.8 \times H2$ is satisfied, where H1 is the blade height at the leading edge of each of the plurality of low solidity nozzle vanes, and H2 is the blade height at the trailing edge of each of the plurality of low solidity nozzle vanes.

With this configuration, since a relationship of $H1 \leq 0.8 \times H2$ is satisfied, the height of the nozzle inlet is larger than that of the nozzle outlet, so that the minimum nozzle area is at the nozzle inlet side. Further, the outflow angle defined by the area of the minimum nozzle throat can be directed radially inward, and the outflow angle fluctuation due to the pressure fluctuation can be increased effectively. Accordingly, it is possible to greatly improve the blade incidence characteristics, and it is possible to improve the turbine efficiency significantly.

(22) A turbine according to another aspect is the turbine described in (20) or (21) in which the plurality of low solidity nozzle vanes includes: a plurality of first low solidity nozzle vanes; and a plurality of second low solidity nozzle vanes each of which has a larger leading edge metal angle than that of the plurality of first low solidity nozzle vanes in a connection position with a hub-side wall surface of the hub-side wall surface and a shroud-side wall surface which define the nozzle passage. The plurality of first low solidity nozzle vanes and the plurality of second low solidity nozzle vanes are arranged so as to be alternately adjacent to each other in the circumferential direction.

With this configuration, since each of the plurality of second low solidity nozzle vanes has a larger leading edge metal angle than that of the plurality of first low solidity nozzle vanes in the connection position with the hub-side wall surface, the angle of the minimum nozzle throat can be reduced, and the throat area can be increased. Thus, the outflow angle fluctuation can be effectively increased while suppressing the increase in aerodynamic loss, and the outflow angle fluctuation due to the pressure fluctuation can be increased.

Further, since the plurality of first low solidity nozzle vanes and the plurality of second low solidity nozzle vanes are arranged so as to be alternately adjacent to each other in the circumferential direction, the outflow angle defined by the minimum nozzle throat can be increased to direct the exhaust gas radially inward, and the outflow angle fluctuation due to the pressure fluctuation can be increased suitably.

Accordingly, it is possible to greatly improve the blade incidence characteristics, and it is possible to improve the turbine efficiency more significantly.

(23) A turbine according to another aspect is the turbine described in (22) in which each of the plurality of first low solidity nozzle vanes has a larger leading edge metal angle than that of each of the plurality of second low solidity nozzle vanes in a connection position with the shroud-side wall surface.

With this configuration, since each of the plurality of first low solidity nozzle vanes has a larger leading edge metal angle than that of each of the plurality of second low solidity nozzle vanes in the connection position with the shroud-side wall surface, the angle of the minimum nozzle throat can be further reduced, and the throat area can be increased. Additionally, the outflow angle is prevented from varying in the circumferential direction due to the pressure fluctuation at the nozzle outlet, and the outflow angle fluctuation can be made uniform in the circumferential direction. Accordingly, the outflow angle fluctuation due to the pressure fluctuation can be increased more suitably. Thus, it is possible to greatly improve the blade incidence characteristics more than before, and it is possible to improve the turbine efficiency.

(24) A turbine according to another aspect is the turbine described in (23) in which the leading edge metal angle of each of the plurality of first low solidity nozzle vanes in the connection position with the hub-side wall surface is equal to the leading edge metal angle of each of the plurality of second low solidity nozzle vanes in the connection position with the shroud-side wall surface, and the leading edge metal angle of each of the plurality of first low solidity nozzle vanes in the connection position with the shroud-side wall surface is equal to the leading edge metal angle of each of the plurality of second low solidity nozzle vanes in the connection position with the hub-side wall surface.

With this configuration, in addition to the effect of (23), the outflow angle is prevented from varying in the circumferential direction due to the pressure fluctuation at the nozzle outlet, and the outflow angle fluctuation can be made uniform in the circumferential direction more effectively. Accordingly, the outflow angle fluctuation due to the pressure fluctuation can be increased significantly. Thus, it is possible to greatly improve the blade incidence characteristics more than before, and it is possible to improve the turbine efficiency.

(25) A turbine according to another aspect is the turbine described in any one of (1) to (24) in which each of the plurality of low solidity nozzle vanes has a trailing edge curved portion (curved portion 6e according to the sixth embodiment) where a trailing edge is curved toward an outer peripheral side.

With this configuration, in addition to the effect of any one of (1) to (24), since each of the plurality of low solidity nozzle vanes has the trailing edge curved portion where the trailing edge is curved toward the outer peripheral side, the geometric nozzle outflow angle can be decreased, that is, the difference between the nozzle geometric outflow angle and the outflow angle defined by the minimum nozzle throat can be increased, so that the outflow angle fluctuation due to the pressure fluctuation can be increased. Therefore, the pressure fluctuation at the turbine inlet can be reduced. Thus, it is possible to greatly improve the blade incidence characteristics by using only low solidity nozzles, and it is possible to improve the turbine efficiency more than before significantly.

(26) A turbine according to another aspect is the turbine described in (25) in which each of the plurality of low solidity nozzle vanes has a difference of 200 or less between a curvature angle of the trailing edge curved portion and a nozzle metal angle of a leading edge.

With this configuration, in addition to the effect of (25), the difference between the nozzle geometric outflow angle and the outflow angle defined by the minimum nozzle throat can be effectively increased, so that the outflow angle fluctuation due to the pressure fluctuation can be increased. Therefore, the pressure fluctuation at the turbine inlet can be reduced. Thus, it is possible to greatly improve the blade incidence characteristics by using only low solidity nozzles, and it is possible to improve the turbine efficiency significantly.

(27) A turbocharger according to an aspect (turbocharger 1 according to the first embodiment) is provided with the turbine described in any one of (1) to (26).

With this configuration, it is possible to achieve the turbocharger having the effect of any one of (1) to (26).

When appropriately and selectively combining the configurations and modifications of the first to sixth embodiments, for example, the nozzle height position adjustment mechanism for adjusting the radial positions of the first nozzle vanes 6a and the second nozzle vanes 6b may be provided to be able to adjust the height and thus throat.

Further, if it is possible to improve the blade incident characteristics by using only the low solidity nozzles 6 more than before, it does not necessarily have to change the radial positions of the nozzle vanes 6 alternately, in other words, dispose the adjacent nozzle vanes 6 at different radial positions.

REFERENCE SIGNS LIST

1 Turbocharger
2 Turbine

3 Turbine wheel
4 Nozzle passage
Turbine housing
5a Hub-side wall surface
5b Shroud-side wall surface
6 Nozzle vane (Low solidity nozzle vane)
6a First nozzle vane (First low solidity nozzle)
6b Second nozzle vane (Second low solidity nozzle)
6c Leading edge (Leading edge portion)
6d Trailing edge (Trailing edge portion)
6e Curved portion (Trailing edge curved portion)
7 Flow rate adjustment mechanism
18 Scroll passage
19 Discharge passage
G Exhaust gas
O1 Axis
th Throat

The invention claimed is:

1. A turbine, comprising:
a turbine wheel configured to rotate about an axis;
a turbine housing accommodating the turbine wheel and defining an annular nozzle passage on an outer peripheral side of the turbine wheel, and
a plurality of nozzle vanes arranged in the nozzle passage at an interval in a circumferential direction,
wherein each of the plurality of nozzle vanes is configured to satisfy $Lv<Lc/Nv$, where $Lv$ is a length of a straight line connecting a leading edge and a trailing edge, $Lc$ is the perimeter of a trailing edge incircle C1 passing through the trailing edge, and $Nv$ is the number of nozzle vanes,
wherein the nozzle passage is defined by a hub-side wall surface and a shroud-side wall surface, and
wherein circumferentially adjacent nozzle vanes are disposed at different radial positions in a connection position of each of the nozzle vanes with the hub-side wall surface.

2. The turbine according to claim 1,
wherein the plurality of nozzle vanes includes:
a plurality of first nozzle vanes; and
a plurality of second nozzle vanes each of which has a trailing edge disposed radially inward of a trailing edge of each of the plurality of first nozzle vanes in the connection position with the hub-side wall surface, and
wherein the plurality of first nozzle vanes and the plurality of second nozzle vanes are arranged so as to be alternately adjacent to each other in the circumferential direction.

3. The turbine according to claim 2,
wherein the trailing edge of each of the plurality of first nozzle vanes is disposed radially inward of the trailing edge of each of the plurality of second nozzle vanes in a connection position with the shroud-side wall surface.

4. The turbine according to claim 2,
wherein each of the plurality of first nozzle vanes has a shorter chord length than that of each of the plurality of second nozzle vanes in the connection position with the hub-side wall surface.

5. The turbine according to claim 3,
wherein each of the plurality of second nozzle vanes has a shorter chord length than that of each of the plurality of first nozzle vanes in the connection position with the shroud-side wall surface.

6. The turbine according to claim 2,
wherein each of the plurality of second nozzle vanes has a larger leading edge portion diameter than that of each of the plurality of first nozzle vanes in the connection position with the hub-side wall surface.

7. The turbine according to claim 6,
wherein a relationship of $D2 \leq 3 \cdot D1$ is satisfied, where $D1$ is the leading edge portion diameter of each of the plurality of first nozzle vanes, and $D2$ is the leading edge portion diameter of each of the plurality of second nozzle vanes.

8. The turbine according to claim 3,
wherein each of the plurality of second nozzle vanes has a larger leading edge portion diameter than that of each of the plurality of first nozzle vanes in the connection position with the hub-side wall surface, and
wherein each of the plurality of first nozzle vanes has a larger leading edge portion diameter than that of each of the plurality of second nozzle vanes in the connection position with the shroud-side wall surface.

9. The turbine according to claim 2,
wherein each of the plurality of second nozzle vanes has a larger leading edge metal angle than that of the plurality of first nozzle vanes.

10. The turbine according to claim 1,
wherein each of the plurality of nozzle vanes is configured such that a blade height of a trailing edge is larger than a blade height of a leading edge.

11. A turbine, comprising:
a turbine wheel configured to rotate about an axis;
a turbine housing accommodating the turbine wheel and defining an annular nozzle passage on an outer peripheral side of the turbine wheel, and
a plurality of nozzle vanes arranged in the nozzle passage at an interval in a circumferential direction,
wherein each of the plurality of nozzle vanes is configured to satisfy $Lv<Lc/Nv$, where $Lv$ is a length of a straight line connecting a leading edge and a trailing edge, $Lc$ is the perimeter of a trailing edge incircle C1 passing through the trailing edge, and $Nv$ is the number of nozzle vanes,
wherein the nozzle passage is defined by a hub-side wall surface and a shroud-side wall surface, and
wherein circumferentially adjacent nozzle vanes have different chord lengths in a connection position of each of the nozzle vanes with the hub-side wall surface.

12. The turbine according to claim 11,
wherein the plurality of nozzle vanes includes:
a plurality of first nozzle vanes; and
a plurality of second nozzle vanes each of which has a shorter chord length than that of each of the plurality of first nozzle vanes in the connection position with the hub-side wall surface, and
wherein the plurality of first nozzle vanes and the plurality of second nozzle vanes are arranged so as to be alternately adjacent to each other in the circumferential direction.

13. The turbine according to claim 12,
wherein a relationship of $L2 \leq 0.8 \times L1$ is satisfied, where $L1$ is the chord length of each of the plurality of first nozzle vanes, and $L2$ is the chord length of each of the plurality of second nozzle vanes.

14. The turbine according to claim 12,
wherein each of the plurality of first nozzle vanes has a shorter chord length than that of each of the plurality of second nozzle vanes in the connection position with the shroud-side wall surface.

15. The turbine according to claim 13,
wherein each of the plurality of second nozzle vanes has a larger leading edge portion diameter than that of each of the plurality of first nozzle vanes in the connection position with the hub-side wall surface.

16. The turbine according to claim 15,
wherein a relationship of D2≤3×D1 is satisfied, where D1 is the leading edge portion diameter of each of the plurality of first nozzle vanes, and D2 is the leading edge portion diameter of each of the plurality of second nozzle vanes.

17. The turbine according to claim 14,
wherein each of the plurality of second nozzle vanes has a larger leading edge portion diameter than that of each of the plurality of first nozzle vanes in the connection position with the hub-side wall surface, and
wherein each of the plurality of first nozzle vanes has a larger leading edge portion diameter than that of each of the plurality of second nozzle vanes in the connection position with the shroud-side wall surface.

18. The turbine according to claim 12,
wherein each of the plurality of second nozzle vanes has a larger leading edge metal angle than that of the plurality of first nozzle vanes.

19. The turbine according to claim 11,
wherein each of the plurality of nozzle vanes is configured such that a blade height of a trailing edge is larger than a blade height of a leading edge.

20. A turbine, comprising:
a turbine wheel configured to rotate about an axis;
a turbine housing accommodating the turbine wheel and defining an annular nozzle passage on an outer peripheral side of the turbine wheel; and
a plurality of nozzle vanes arranged in the nozzle passage at an interval in a circumferential direction,
wherein each of the plurality of nozzle vanes is configured to satisfy $Lv < Lc/Nv$, where Lv is a length of a straight line connecting a leading edge and a trailing edge, Lc is the perimeter of a trailing edge incircle C1 passing through the trailing edge, and Nv is the number of nozzle vanes, and
wherein each of the plurality of nozzle vanes is configured such that a blade height of a trailing edge is larger than a blade height of a leading edge.

21. The turbine according to claim 20,
wherein a relationship of $H1 \leq 0.8 \times H2$ is satisfied, where H1 is the blade height at the leading edge of each of the plurality of nozzle vanes, and H2 is the blade height at the trailing edge of each of the plurality of nozzle vanes.

22. The turbine according to claim 20,
Wherein the nozzle passage is defined by a hub-side wall surface and a shroud-side wall surface,
wherein the plurality of nozzle vanes includes:
a plurality of first nozzle vanes; and
a plurality of second nozzle vanes each of which has a larger leading edge metal angle than that of the plurality of first nozzle vanes in a connection position with the hub-side wall surface, and
wherein the plurality of first nozzle vanes and the plurality of second nozzle vanes are arranged so as to be alternately adjacent to each other in the circumferential direction.

23. The turbine according to claim 22,
wherein each of the plurality of first nozzle vanes has a larger leading edge metal angle than that of each of the plurality of second nozzle vanes in a connection position with the shroud-side wall surface.

24. The turbine according to claim 22,
wherein the leading edge metal angle of each of the plurality of first nozzle vanes in the connection position with the hub-side wall surface is equal to the leading edge metal angle of each of the plurality of second nozzle vanes in the connection position with the shroud-side wall surface, and
wherein the leading edge metal angle of each of the plurality of first nozzle vanes in the connection position with the shroud-side wall surface is equal to the leading edge metal angle of each of the plurality of second nozzle vanes in the connection position with the hub-side wall surface.

25. The turbine according to claim 1,
wherein each of the plurality of nozzle vanes has a trailing edge curved portion where a trailing edge is curved toward an outer peripheral side.

26. The turbine according to claim 25,
wherein each of the plurality of nozzle vanes has a difference of 20° or less between a curvature angle of the trailing edge curved portion and a nozzle metal angle of a leading edge.

27. A turbocharger, comprising the turbine according to claim 1.

* * * * *